US009849858B2

(12) United States Patent
Inazumi et al.

(10) Patent No.: US 9,849,858 B2
(45) Date of Patent: Dec. 26, 2017

(54) AIRBAG DEVICE

(71) Applicant: ASHIMORI INDUSTRY CO., LTD., Osaka-shi, Osaka (JP)

(72) Inventors: Takeshi Inazumi, Settsu (JP); Satoshi Yamashita, Settsu (JP); Yuta Minami, Settsu (JP)

(73) Assignee: ASHIMORI INDUSTRY CO., LTD., Osaka (JP)

( * ) Notice: Subject to any disclaimer, the term of this patent is extended or adjusted under 35 U.S.C. 154(b) by 0 days.

(21) Appl. No.: 15/259,722

(22) Filed: Sep. 8, 2016

(65) Prior Publication Data
US 2017/0080891 A1    Mar. 23, 2017

(30) Foreign Application Priority Data

Sep. 18, 2015    (JP) .................................. 2015-185030

(51) Int. Cl.
*B60R 21/237*    (2006.01)
*B60R 21/2338*    (2011.01)

(52) U.S. Cl.
CPC ........ *B60R 21/237* (2013.01); *B60R 21/2338* (2013.01); *B60R 2021/23388* (2013.01)

(58) Field of Classification Search
CPC .............. B60R 21/237; B60R 21/2338; B60R 2021/23388
See application file for complete search history.

(56) References Cited

U.S. PATENT DOCUMENTS

| | | | | |
|---|---|---|---|---|
| 5,873,598 A * | 2/1999 | Yoshioka | ............ | B60R 21/2171 280/732 |
| 7,314,228 B2 * | 1/2008 | Ishiguro | ................ | B60R 21/201 280/728.1 |
| 7,900,958 B2 * | 3/2011 | Yamauchi | ............. | B60R 21/205 280/732 |
| 8,608,195 B2 * | 12/2013 | Yamada | ................ | B60R 21/201 280/732 |
| 2012/0326421 A1 * | 12/2012 | Motomochi | .......... | B60R 21/237 280/732 |
| 2013/0001937 A1 | 1/2013 | Yamada | | |

FOREIGN PATENT DOCUMENTS

DE    102007023816 A1 *  11/2008  .......... B60R 21/233
JP    2013-10430 A    1/2013

* cited by examiner

*Primary Examiner* — Drew J Brown
(74) *Attorney, Agent, or Firm* — Sughrue Mion, PLLC

(57) ABSTRACT

There is provided an airbag device with a reduced risk of injury to an occupant in the initial inflation and deployment of an airbag. The airbag has a roll folded portion in the rear side of a vehicle thereof, and a flip folded portion in the front side of the vehicle thereof, and is surrounded by a holding member. The holding member permits inflation and deployment of the airbag only from an opening. The flap has a first restricting portion, a second restricting portion and a third restricting portion joined together in a Y shape, and restricts the inflation and deployment of the airbag. The first restricting portion covers a portion of the roll folded portion of the opening side, and is disposed between the roll folded portion and the holding member. A tip of the second restricting portion is secured to the flip folded portion. The third restricting portion is folded into the flip folded portion.

3 Claims, 17 Drawing Sheets

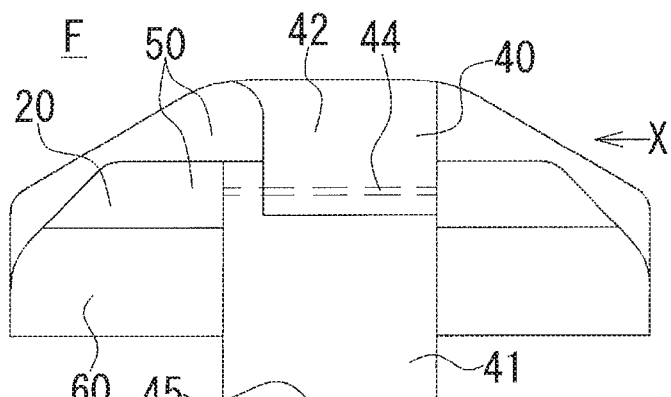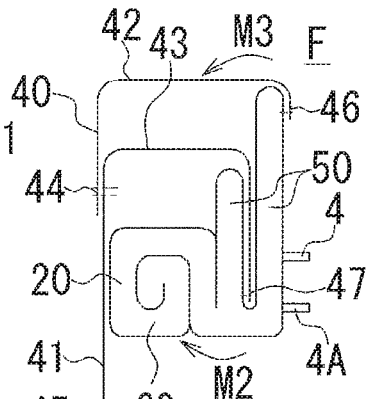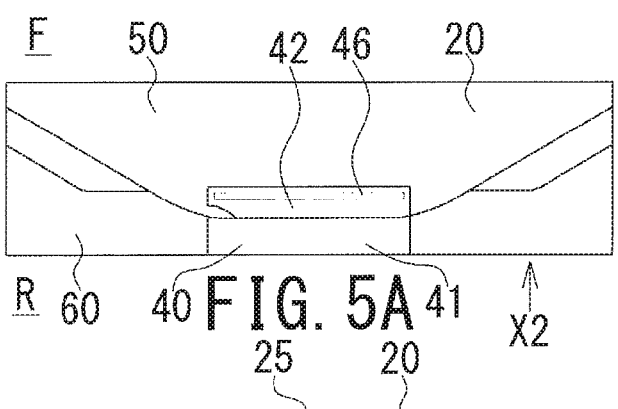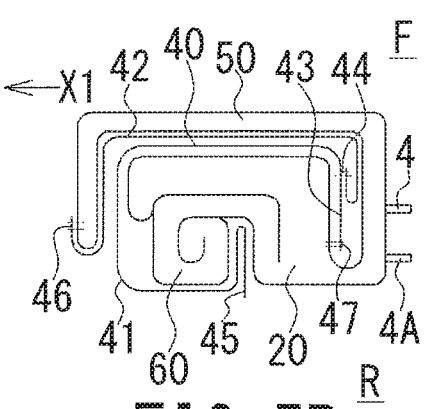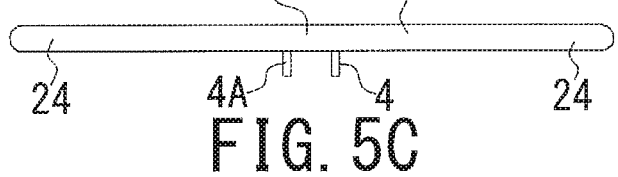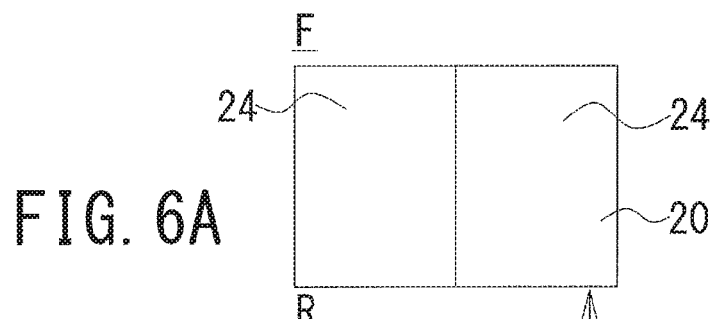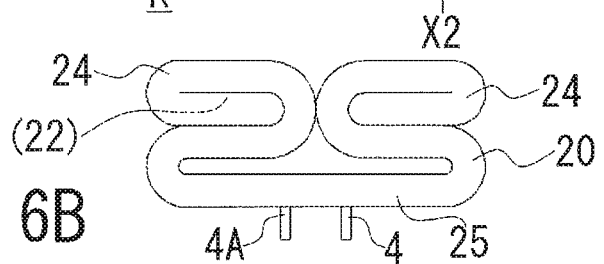

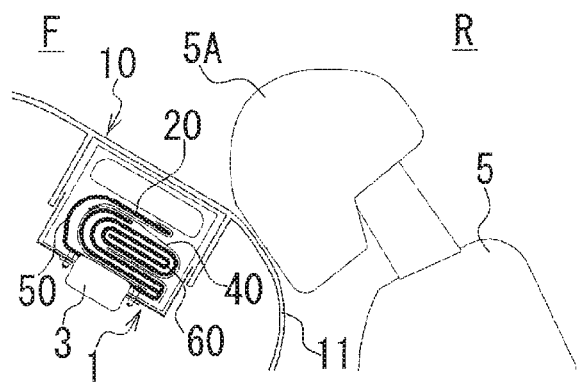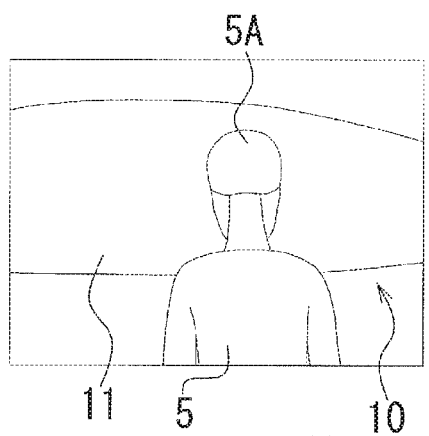
FIG. 14A  FIG. 14B
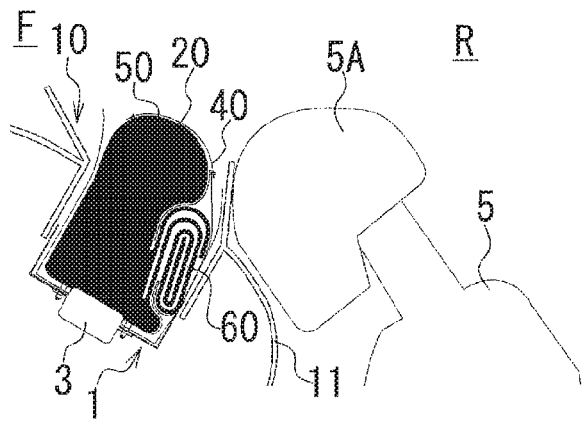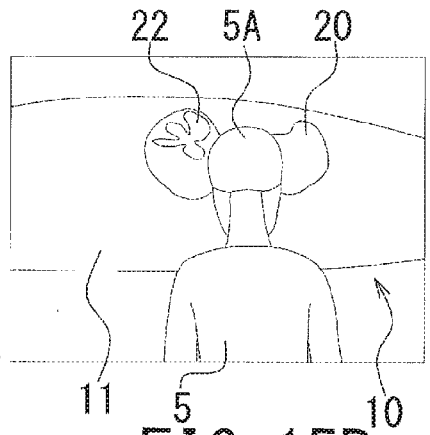
FIG. 15A  FIG. 15B
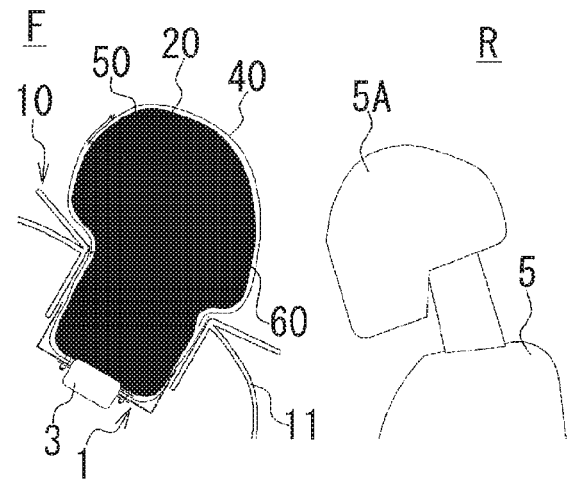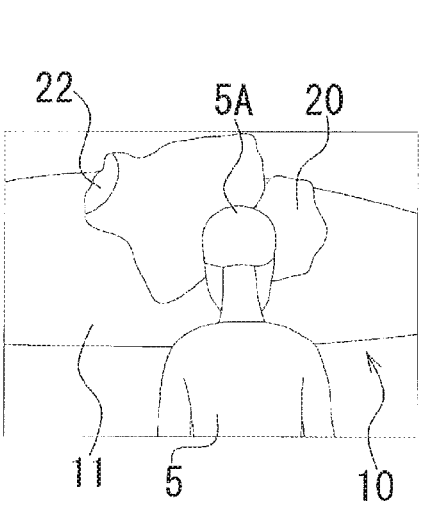
FIG. 16A  FIG. 16B

AIRBAG DEVICE

BACKGROUND OF THE INVENTION (1) Field of the Invention

The present invention relates to an airbag device that to be disposed in the front side of a vehicle facing an occupant.

(2) Description of Related Art

An airbag device for a frontal collision of a vehicle is mounted to the vehicle in order to protect an occupant in the vehicle when the vehicle collided with an object ahead (in the event of a frontal collision). The airbag device includes an airbag that inflates and deploys in front of the occupant and holds the occupant (at least the occupant's head) in the event of the frontal collision. Further, the airbag device is required to reduce a risk of injury to an occupant even though the occupant is in an abnormal posture (a so-called out-of-position (OOP)), for example, being inclined frontward as compared to a normal sitting posture. In particular, the risk of injury to the occupant by the airbag in the initial inflation and deployment is large and so must be reduced.

In order to address the risk, an airbag device has been known, in which a part of a folded airbag is covered with a wrapping member (a flap) that restricts rapid inflation of the airbag toward the rear side of a vehicle (toward an occupant) in the initial inflation and deployment of the airbag (see Japanese Laid open Patent Application Publication No. 2013-10430).

However, with the conventional airbag device disclosed in Japanese Laid open Patent Application Publication No. 2013-10430, it is difficult to satisfactorily reduce the risk of injury to an occupant in the OOP by the airbag just even when the inflation of the airbag is restricted with the wrapping member. Accordingly, a recess is formed at the central portion of the airbag, which will be brought into contact with the occupant, to guide the gas in the lateral directions, thereby reducing the projection of the airbag toward the occupant's head. Consequently, the shape of the airbag in the conventional airbag device is complicated and the manufacture of the airbag is difficult.

SUMMARY OF THE INVENTION

The present invention has been made in view of the conventional problems described above, and an object thereof is to reduce the risk of injury to an occupant associated with an airbag in initial inflation and deployment, without complicating the shape of the airbag.

The present invention provides an airbag device to be disposed in a front side of a vehicle facing an occupant. The airbag device includes: an inflator that generates gas; an airbag that inflates with the gas generated by the inflator; a holding member that surrounds the airbag, and has a fixing portion to which the airbag and the inflator are fixed and an opening opposite to the fixing portion, and permits inflation and deployment of the airbag only through the opening; and a flap that has a first restricting portion, a second restricting portion and a third restricting portion joined together in a Y shape at a junction, and restricts the inflation and deployment of the airbag through the opening of the holding member. The airbag has a roll folded portion, which is folded into a roll, disposed to a rear side of the vehicle thereof, and a flip folded portion, which is folded up into accordion or is tucked, disposed on the front side of the vehicle thereof. The first restricting portion covers an opening side portion of the roll folded portion, and is disposed between a vehicle rear side portion of the roll folded portion and the holding member. A tip of the second restricting portion is secured to the flip folded portion. The third restricting portion is folded into the flip folded portion or between the flip folded portion and the roll folded portion.

The present invention can reduce the risk of injury to an occupant associated with an airbag in initial inflation and deployment without complicating the shape of the airbag.

BRIEF DESCRIPTION OF THE DRAWINGS

FIGS. 4A and 4B are each a diagram showing the procedure of folding the airbag according to the first embodiment.

FIGS. 5A to 5C are each a diagram showing the procedure of folding the airbag according to the first embodiment.

FIGS. 6A and 6B are each a diagram showing the procedure of folding the airbag according to the first embodiment.

FIGS. 14A and 14B are each a diagram for describing protection of an occupant in an OOP posture by the airbag according to the first embodiment.

FIGS. 15A and 15B are each a diagram for describing the protection of the occupant in the OOP posture by the airbag according to the first embodiment.

FIGS. 16A and 16B are each a diagram for describing the protection of the occupant in the OOP posture by the airbag according to the first embodiment.

DETAILED DESCRIPTION OF PREFERRED EMBODIMENTS

A description will be given of an airbag device according to embodiments of the present invention with reference to the drawings.

The airbag device according to the embodiments is for a frontal collision of a vehicle and to be mounted in the vehicle to protect an occupant by an airbag, in the event of a frontal collision of the vehicle. Further, the airbag device is disposed in the front side of the vehicle facing the occupant sitting on a seat of the vehicle, and holds the occupant with the inflated and deployed airbag. It should be noted that the directions and positions with respect to the airbag device being mounted in the vehicle, and for example expressed by phrases such as on the front side of the vehicle, and on the rear side of the vehicle.

First Embodiment

Figure 1:
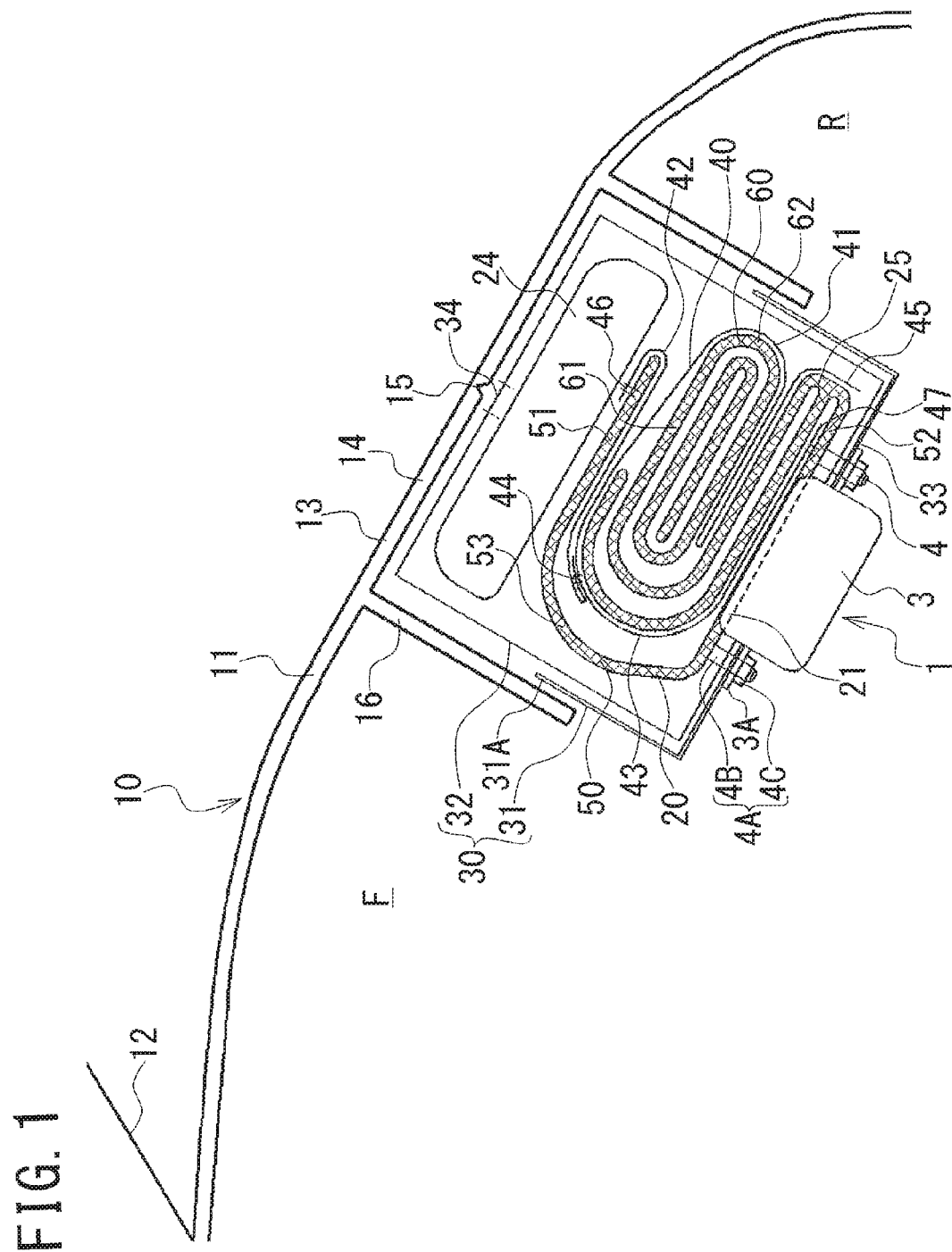
FIG. 1 is a cross-sectional view showing the structure of an airbag device according to a first embodiment.

FIG. 1 is a cross-sectional view showing the structure of an airbag device 1 according to a first embodiment, schematically showing the airbag device 1 mounted in a vehicle 10 as seen from the width direction of the vehicle 10. In FIG. 1, the inside of an airbag 20 is hatched, and the contour of the hatched region corresponds to a surface of the airbag 20.

As shown in FIG. 1, the vehicle 10 includes an instrument panel 11 positioned in the front side thereof relative to a front passenger's seat, and a windshield 12 positioned above the instrument panel 11. The airbag device 1 is for the front passenger's seat and is disposed on the front side facing the front passenger's seat. The airbag device 1 protects an occupant on the front passenger's seat with the inflatable and deployable airbag 20. Further, the airbag device 1 is attached to the instrument panel 11, and is disposed below the windshield 12.

A part of the instrument panel 11 forms an airbag cover 13 of the airbag device 1. The airbag device 1 is attached to the airbag cover 13 inside the instrument panel 11. The airbag cover 13 has a lid 14 that covers the airbag device 1, groove-like tear lines 15 formed on the back side of the lid 14, and a peripheral wall 16 that projects from the lid 14 inside the instrument panel 11.

A part of the airbag device 1 is housed in the airbag cover 13, and the airbag device 1 is attached to the peripheral wall 16 of the airbag cover 13. In inflation and deployment of the airbag 20, the tear lines 15 are torn by the inflated airbag 20, so that the lid 14 of the airbag cover 13 opens to the cabin. The inflated airbag 20 deploys through the opened lid 14 toward the cabin, and fully inflates and deploys in the cabin.

The airbag device 1 includes an inflator 3 that generates gas, the airbag 20 being inflatable and deployable, a holding member 30 that holds the airbag 20, a flap 40 coupled to the airbag 20, and a fixing member 4. The airbag 20 has a gas supplied port 21, and is disposed in the airbag cover 13 as being folded. The inflator 3 is inserted into the gas supplied port 21, so that a part (the gas generator portion) of the inflator 3 is disposed inside the airbag 20. The inflator 3 generates gas inside the airbag 20, and the airbag 20 inflates with the gas generated by the inflator 3. Further, by the inflator 3 supplying the gas into the airbag 20, the airbag 20 gradually inflates and deploys from the folded state.

The holding member 30 has a first housing 31 and a second housing 32, and holds the folded airbag 20 with the first housing 31 and the second housing 32. The first housing 31 is a metal case, and houses a part of the airbag 20. The second housing 32 is a fabric wrapping member, which is disposed around the airbag 20 to wrap the airbag 20. A coupling portion 31A of the first housing 31 is coupled to the peripheral wall 16 of the airbag cover 13, so that the holding member 30 is attached to the airbag cover 13. Thus, the airbag device 1 is attached to the airbag cover 13 and the instrument panel 11.

The holding member 30 has a fixing portion 33 which is a part of the first housing 31, and an opening 34 opposite to the fixing portion 33. The airbag 20 and the inflator 3 are fixed to the fixing portion 33, and are surrounded by the holding member 30. The opening 34 of the holding member 30 is, for example, a slit or an elongated opening formed at the second housing 32. The opening 34 is disposed between the folded airbag 20 and the lid 14 of the airbag cover 13, and facing the lid 14. The holding member 30 permits the airbag 20 to inflate and deploy only through the opening 34. The airbag 20 inflates and deploys through the opening 34 toward the cabin which is the outside of the holding member 30.

The fixing member 4 has an annular member (not shown) which is inside the airbag 20 and around the inflator 3, and a plurality of attaching members 4A that project from the annular member and are positioned outside the airbag 20. The attaching members 4A are made up of bolts 4B that project to outside from inside of the airbag 20, and nuts 4C that screw with the bolts 4B. In the state in which the bolts 4B of the attaching members 4A penetrate through coupling holes formed at each of the airbag 20, the second housing 32, the first housing 31, and a flange 3A of the inflator 3, the nuts 4C screw with the bolts 4B. Thus, the airbag 20, the holding member 30 (the second housing 32, the first housing 31), and the inflator 3 are coupled to one another, and the airbag 20 and the inflator 3 are attached to the holding member 30. The fixing member 4 fixes the airbag 20 and the inflator 3 to the fixing portion 33 of the holding member 30 with the attaching members 4A.

The flap 40 is a restricting member formed by one or more pieces of fabric, and restricts the inflation and deployment of the airbag 20. The flap 40 is disposed along a surface of the airbag 20 so as to be overlaid on a predetermined portion of the folded airbag 20 in the holding member 30. The surface of the airbag 20 refers to the outside surface (outer surface) of the inflated airbag 20, and the flap 40 is positioned outside the airbag 20 when the airbag 20 has inflated.

Figure 2A:
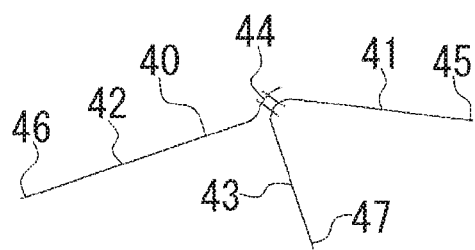
FIGS. 2A and 2B are each a diagram showing a flap according to the first embodiment.
Figure 2B:
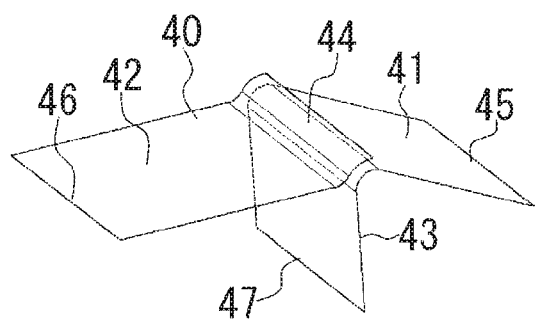
Figure 3A:
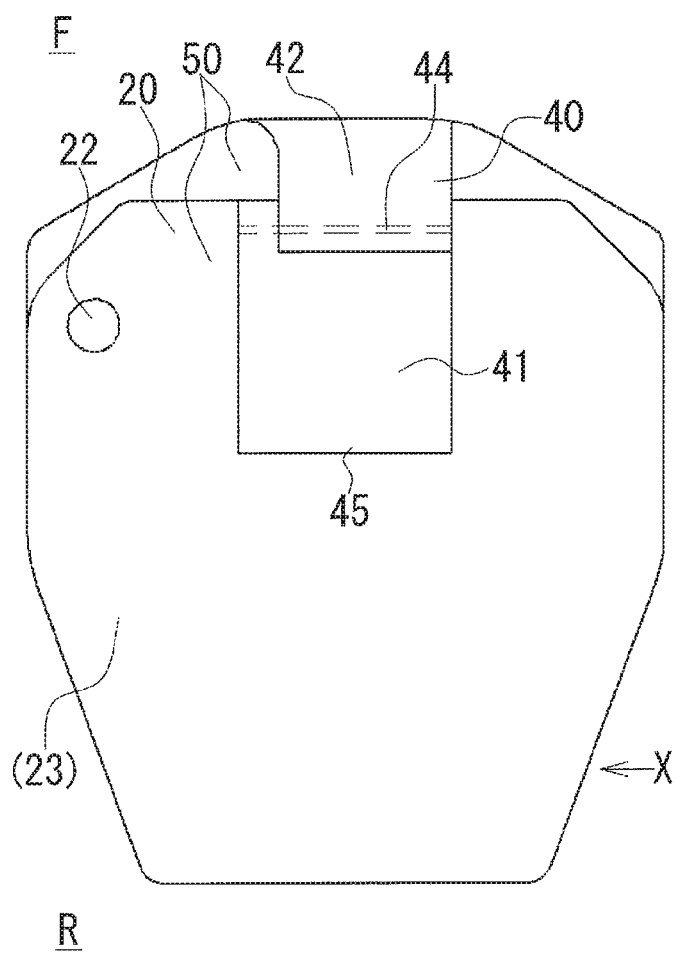
FIGS. 3A and 3B are each a diagram showing a procedure of folding an airbag according to the first embodiment.
Figure 3B:
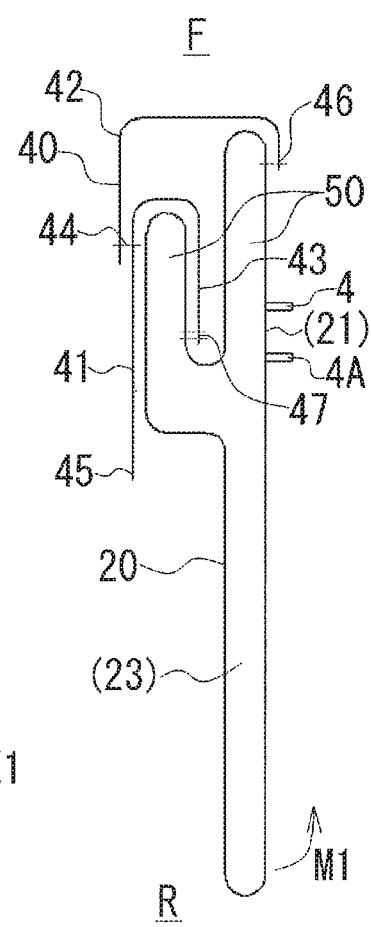

FIGS. 2A and 2B are each a diagram showing the flap 40 according to the first embodiment, the flap 40 being detached from the airbag 20. FIG. 2A is a cross-sectional view of the flap 40 corresponding to FIG. 1. FIG. 2B is a perspective view of the flap 40.

As shown in FIGS. 2A and 2B, the flap 40 has three restricting portions (a first restricting portion 41, a second restricting portion 42, a third restricting portion 43), a junction 44, a first end 45 at the tip of the first restricting portion 41, a second end 46 at the tip of the second restricting portion 42, and a third end 47 at the tip of the third restricting portion 43.

The first restricting portion 41, the second restricting portion 42, and the third restricting portion 43 are each a flap portion formed into a flap shape having one end as a secured end and the other end as a free end. The flap 40 restricts the inflation and deployment of the airbag 20 with the first restricting portion 41, the second restricting portion 42 and the third restricting portion 43. The first restricting portion 41 and the third restricting portion 43 are a single piece of quadrangular fabric, and the junction 44 is positioned between the first restricting portion 41 and the third restricting portion 43. The second restricting portion 42 is a single piece of quadrangular fabric, and is sewn to the first restricting portion 41 and the third restricting portion 43 at the junction 44.

The first restricting portion 41, the second restricting portion 42 and the third restricting portion 43 are joined together in a Y shape at the junction 44. Thus, the flap 40 is formed into the Y shape. The first end 45 is the tip of the first restricting portion 41, and the second end 46 is the tip of the second restricting portion 42. The third end 47 is the tip of the third restricting portion 43. The first end 45, the second end 46, and the third end 47 are respectively positioned at three tips of the Y-shaped flap 40. In state of the airbag 20 fold (see FIG. 1), the portions 41 to 47 of the flap 40 are disposed at predetermined positions on the airbag 20.

FIGS. 3A to 6B are each a diagram showing a procedure of folding the airbag 20 according to the first embodiment, which schematically show the airbag 20 in each folding phase. Further, FIGS. 3A, 4A, 5A, and 6A are plan views of the airbag 20, and FIGS. 3B, 4B, and 5B are side views of the airbag 20 as seen in a direction of an arrow X1 in FIGS. 3A, 4A, and 5A, respectively. FIGS. 5C and 6B are front views of the airbag 20 as seen in a direction of an arrow X2 in FIGS. 5A and 6A, respectively. FIG. 5C does not show the folded shape of the airbag 20 and instead shows the elongated airbag 20 in a schematically simplified manner. FIG. 6B shows the state in which the airbag 20 in FIG. 5C is folded.

As shown in FIGS. 3A to 6B, the airbag 20 is a fabric bag, and has a single vent hole 22 (see FIG. 3A), and a single chamber 23 formed by the airbag 20. In the inflation and deployment of the airbag 20, gas is discharged to the outside from the inside of the airbag 20 through the vent hole 22. The fixing member 4 is disposed inside the airbag 20, and a plurality of attaching members 4A of the fixing member 4 project to outside from inside of the airbag 20. The second end 46 and third end 47 of the flap 40 are sewn to the airbag 20, and are thus secured to the surface of the airbag 20.

When the airbag 20 is folded, firstly (see FIGS. 3A and 3B), a vehicle front side portion at a front side F of the vehicle 10 of the airbag 20 (hereinafter, referred to as a vehicle front side F) is flip folded to form a flip folded portion 50 in a flip-fold shape at the vehicle front side F of the airbag 20. The flip folding is folding up into accordion, or is tucking, i.e., pleating the outer surface of the airbag 20. Accordingly, the flip-fold shape is an accordion-fold shape or a tucked shape. At the flip folded portion 50, the airbag 20 is folded up into accordion or is tucked, while alternating the folding direction between the vehicle front side F and a rear side R of the vehicle 10 (hereinafter, referred to as a vehicle rear side R). Thus, the flip folded portion 50 folded up into accordion or tucked is formed.

The flip folded portion 50 is a portion of the folded airbag 20 which is folded up into accordion or is tucked. To fold the airbag 20 into accordion, the overlaid portion of the spread airbag 20 is folded up into accordion shape. To fold the airbag 20 tucked, and one side of the overlaid portion of the spread airbag 20 is folded back to form a tucked shape, i.e., tucked. Here, the flip folded portion 50 is a tuck folded portion having the tucked shape, and is formed at the airbag 20 by tucking.

Specifically, a part of the vehicle front side portion of the airbag 20 is folded into another part of the vehicle front side portion of the airbag 20 to form one tuck shape. Thus, the flip folded portion 50 being tucked is formed at the vehicle front side F of the airbag 20. Simultaneously, the third restricting portion 43 and the third end 47 of the flap 40 are disposed between the flip folded portion 50, Further, the first restricting portion 41 and second restricting portion 42 of the flap 40 are overlaid on the flip folded portion 50.

Next, a vehicle rear side portion at the vehicle rear side R of the airbag 20 is rolled up to form a roll folded portion 60 in a roll folded shape at the vehicle rear side R of the airbag 20 (see FIGS. 4A and 4B). Here, on the side where the fixing portion 33 of the holding member 30 is positioned (on the fixing portion 33 side) (right side in FIG. 3B), the airbag 20 is rolled up from the vehicle rear side R toward the vehicle front side F (see an arrow M1 in FIG. 3B), so that the airbag 20 is folded up into a roll. Subsequently, the rolled up portion of the airbag 20 is folded back in the opposite side relative to the fixing portion 33 (see an arrow M2 in FIG. 4B), to form the roll folded portion 60 which is folded up into a roll shape in the vehicle rear side R of the airbag 20.

The roll folded portion 60, which is folded up into the roll shape, and is adjoined to the vehicle rear side R portion of the flip folded portion 50. In this state, the first restricting portion 41 and second restricting portion 42 of the flap 40 are disposed as to cover the flip folded portion 50 and the roll folded portion 60. Further, a vehicle front side portion of the flip folded portion 50 is folded back toward the roll folded portion 60 (see an arrow M3 in FIG. 4B), so that the flip folded portion 50 is disposed around the roll folded portion 60 except for a vehicle rear side portion (see FIG. 5B). Here, the third restricting portion 43 and junction 44 of the flap 40 are positioned in the flip folded portion 50. The third end 47 of the flap 40 is secured to the flip folded portion 50 in the flip folded portion 50, and the second end 46 of the flap 40 is secured to the flip folded portion 50 outside the flip folded portion 50.

Subsequently, the first restricting portion 41 of the flap 40 is disposed around the roll folded portion 60 so as to cover the vehicle rear side portion of the roll folded portion 60, and the first restricting portion 41 is inserted into the roll folded portion 60 from vehicle rear side R and turned back. Thereby, the first end 45 of the flap 40 is positioned outside the roll folded portion 60. Finally, opposite sides 24 in the vehicle width direction of the airbag 20 are folded inward in the vehicle width direction so as to conform to the width of the holding member 30, and are overlaid on a central portion 25 in the vehicle width direction of the airbag 20 (see FIGS. 6A and 6B). In this state, the vent hole 22 of the airbag 20 is positioned on one of the sides 24 of the folded airbag 20.

After the airbag 20 is folded according to the foregoing procedure, the airbag device 1 is assembled, thereby the airbag 20 is disposed in the holding member 30 (see FIG. 1). The airbag 20 is held by the holding member 30 as being folded. Further, the airbag device 1 is mounted in the vehicle 10, and is disposed in the vehicle front side facing the occupant on the front passenger's seat. The folded airbag 20 has the flip folded portion 50 as a first folded portion, and the roll folded portion 60 as a second folded portion, and is disposed in the vehicle 10 as being surrounded by the holding member 30.

At the airbag 20 disposed in the vehicle 10, the flip folded portion 50 is disposed in the vehicle front side F of the airbag 20, and the roll folded portion 60 is disposed in the vehicle rear side R of the airbag 20. Further, the folded opposite sides 24 of the airbag 20 are disposed closer to the opening 34 of the holding member 30 than the central portion 25 of the airbag 20 and cover the central portion 25. The flip folded portion 50 is at least disposed on the vehicle front side portion of the roll folded portion 60. In the present embodiment, the flip folded portion 50 is also disposed between the roll folded portion 60 and the fixing portion 33 of the holding member 30, in addition to the vehicle front side portion of the roll folded portion 60. Further, the flip folded portion 50 is also disposed between the roll folded portion 60 and the opening 34 of the holding member 30, and covers the roll folded portion 60 from the opening 34 side.

In the state where the airbag 20 is disposed in the vehicle 10, the first restricting portion 41 of the flap 40 covers a portion (an opening side portion 61) of the roll folded portion 60 at the opening 34 side of the airbag 20 and is disposed between the vehicle rear side portion (a rear-side portion 62) of the roll folded portion 60 and the holding member 30. The first end 45 of the flap 40 is not secured to the airbag 20 and is disposed between the airbag 20 and the holding member 30 on the fixing portion 33 side of the holding member 30 relative to the roll folded portion 60.

The flip folded portion 50 has a portion (a covering portion 51) that covers the roll folded portion 60 from the opening 34 side, and the second restricting portion 42 of the flap 40 is disposed along the covering portion 51 of the flip folded portion 50. The second end 46 of the flap 40 is disposed closer to the opening 34 than the covering portion 51 and is secured to the covering portion 51 of the flip folded portion 50. Between the second end 46 and the holding member 30 on the vehicle front side F, the flip folded portion 50 is not covered with the flap 40.

The third restricting portion 43 of the flap 40 is folded into the flip folded portion 50 or between the flip folded portion 50 and the roll folded portion 60. Further, the flip folded portion 50 has a portion (a superimposing portion 52) superimposed on the fixing portion 33 of the holding member 30. The third restricting portion 43 is disposed into the flip folded portions 50 or between the flip folded portion 50 and the roll folded portion 60, at between the superimposing portion 52 of the flip folded portion 50 and the roll folded portion 60. In the present embodiment, the third restricting portion 43 is disposed into the flip folded portion 50 and is folded into the flip folded portion 50, at the vehicle front side portion (a front-side portion 53) of the flip folded portion 50 and at the superimposing portion 52. The third end 47 of the flap 40 is disposed into the flip folded portion 50 and is secured to the flip folded portion 50, between the superimposing portion 52 of the flip folded portion 50 and the roll folded portion 60.

In an emergency of the vehicle 10, in response to an activation signal received from an instruction device of the vehicle 10, the inflator 3 is activated to generate gas. While the airbag 20 unfolding by the gas, the airbag 20 passes through the opening 34 of the holding member 30 and the lid 14 of the opened airbag cover 13, and inflates and deploys in the vehicle front side F at the occupant. At that time, the flap 40 restricts the inflation and deployment of the airbag 20 through the opening 34.

FIGS. 7 to 13 are each a cross-sectional view showing a manner of inflation and deployment of the airbag 20 according to the first embodiment, which schematically show the airbag device 1 and the airbag 20 similarly to FIG. 1.

Figure 7:
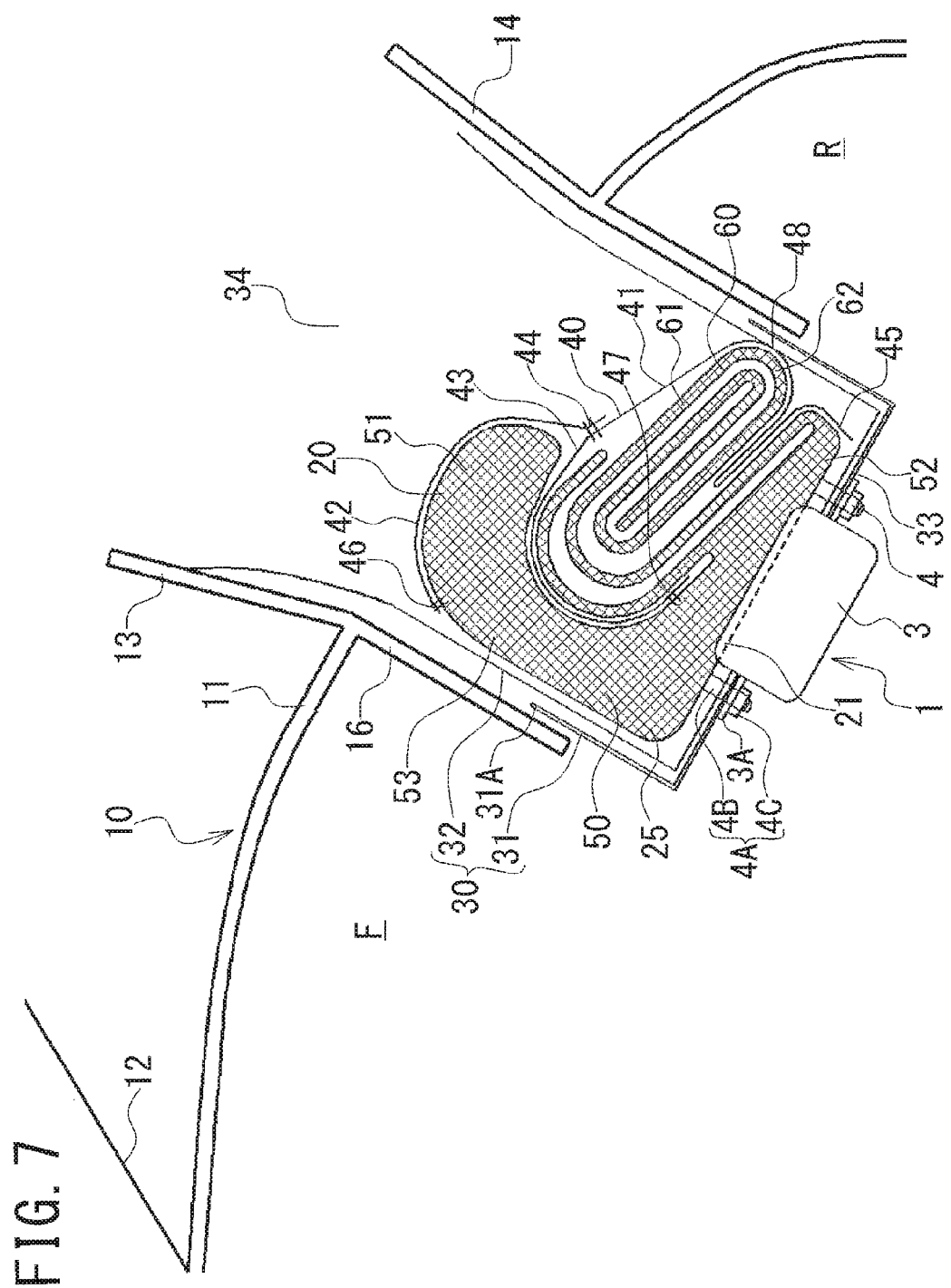
FIG. 7 is a cross-sectional view showing a manner of inflation and deployment of the airbag according to the first embodiment.
Figure 8:
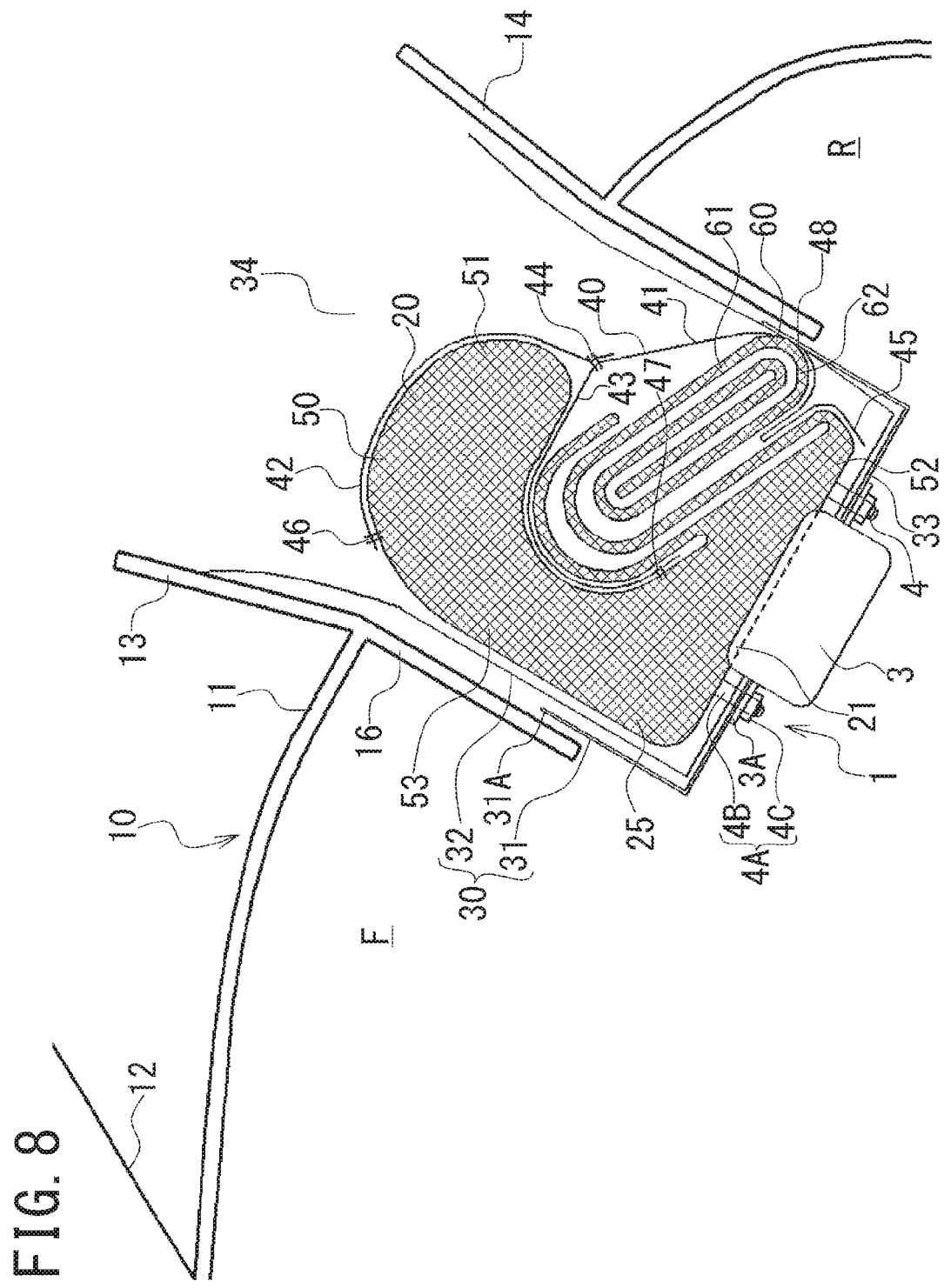
FIG. 8 is a cross-sectional view showing the manner of inflation and deployment of the airbag according to the first embodiment.
Figure 9:
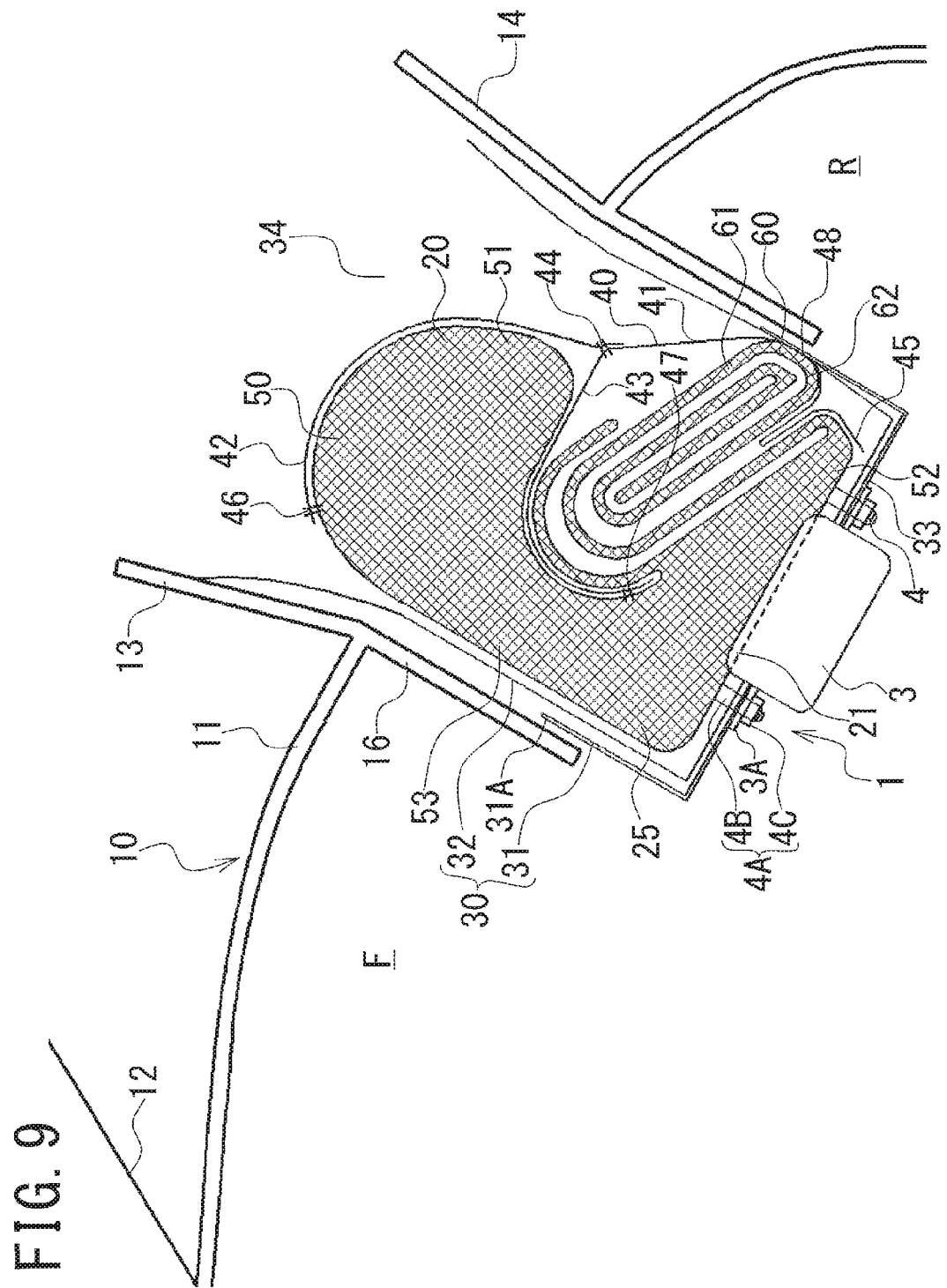
FIG. 9 is a cross-sectional view showing the manner of inflation and deployment of the airbag according to the first embodiment.
Figure 10:
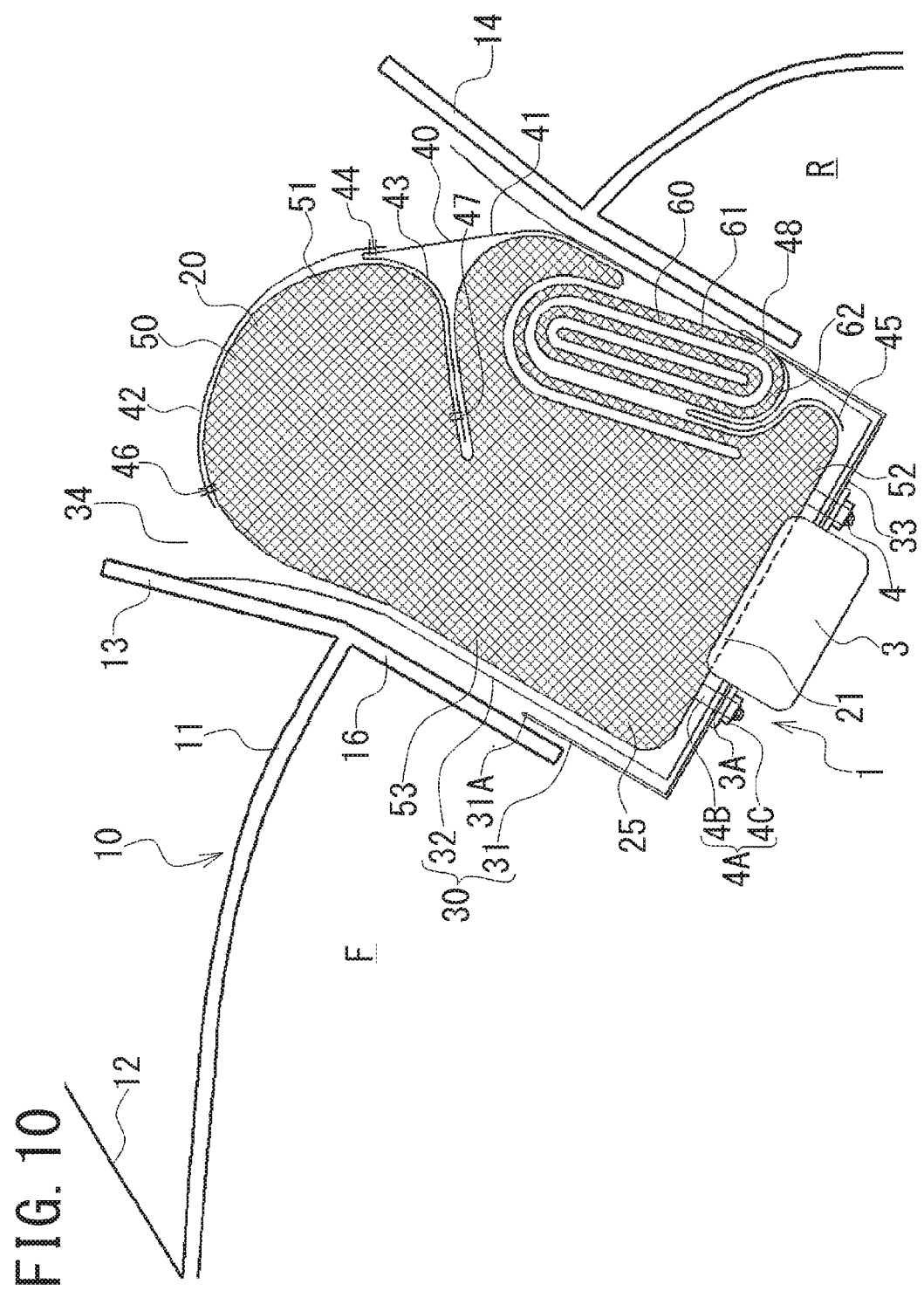
FIG. 10 is a cross-sectional view showing the manner of inflation and deployment of the airbag according to the first embodiment.
Figure 11:
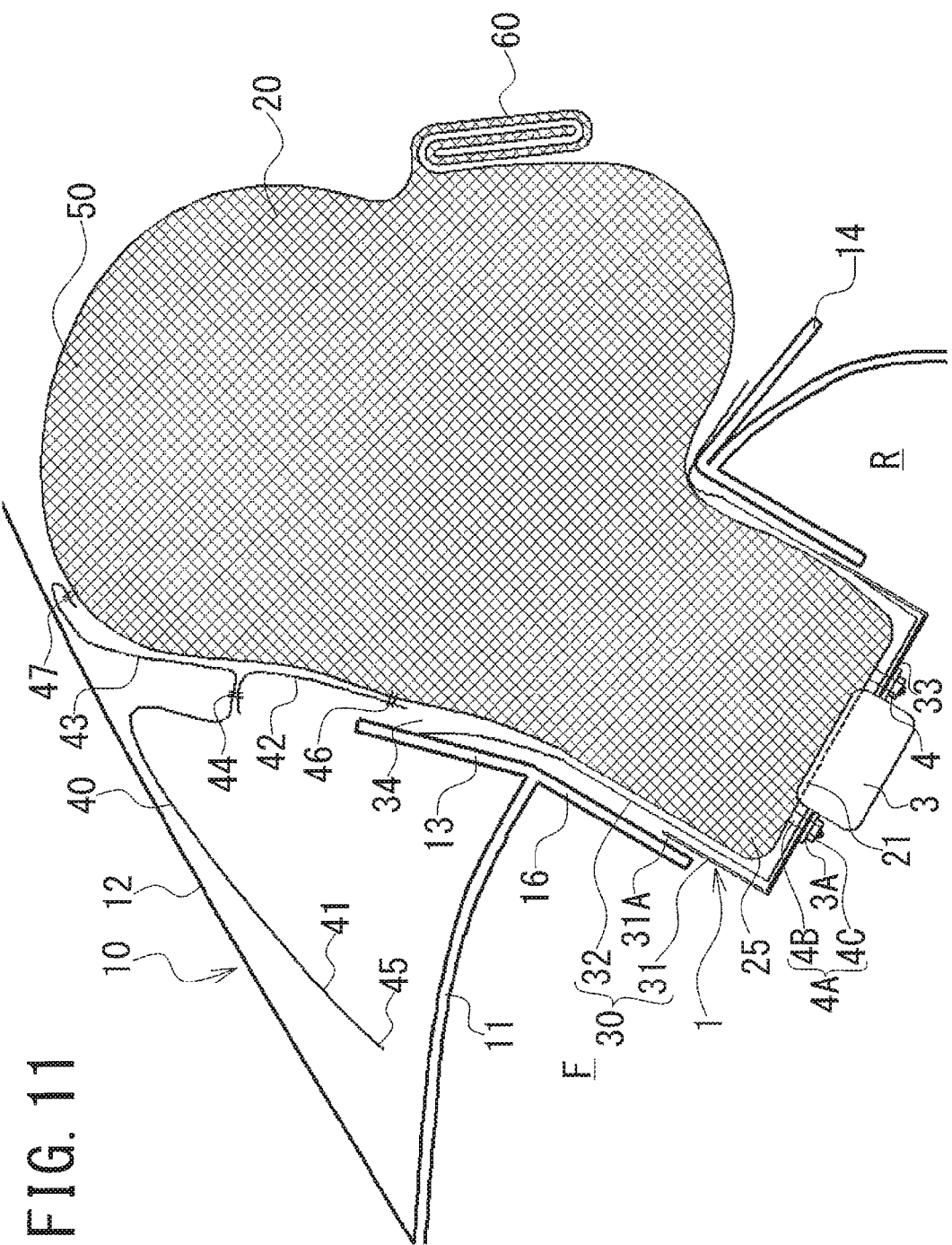
FIG. 11 is a cross-sectional view showing the manner of inflation and deployment of the airbag according to the first embodiment.
Figure 12:
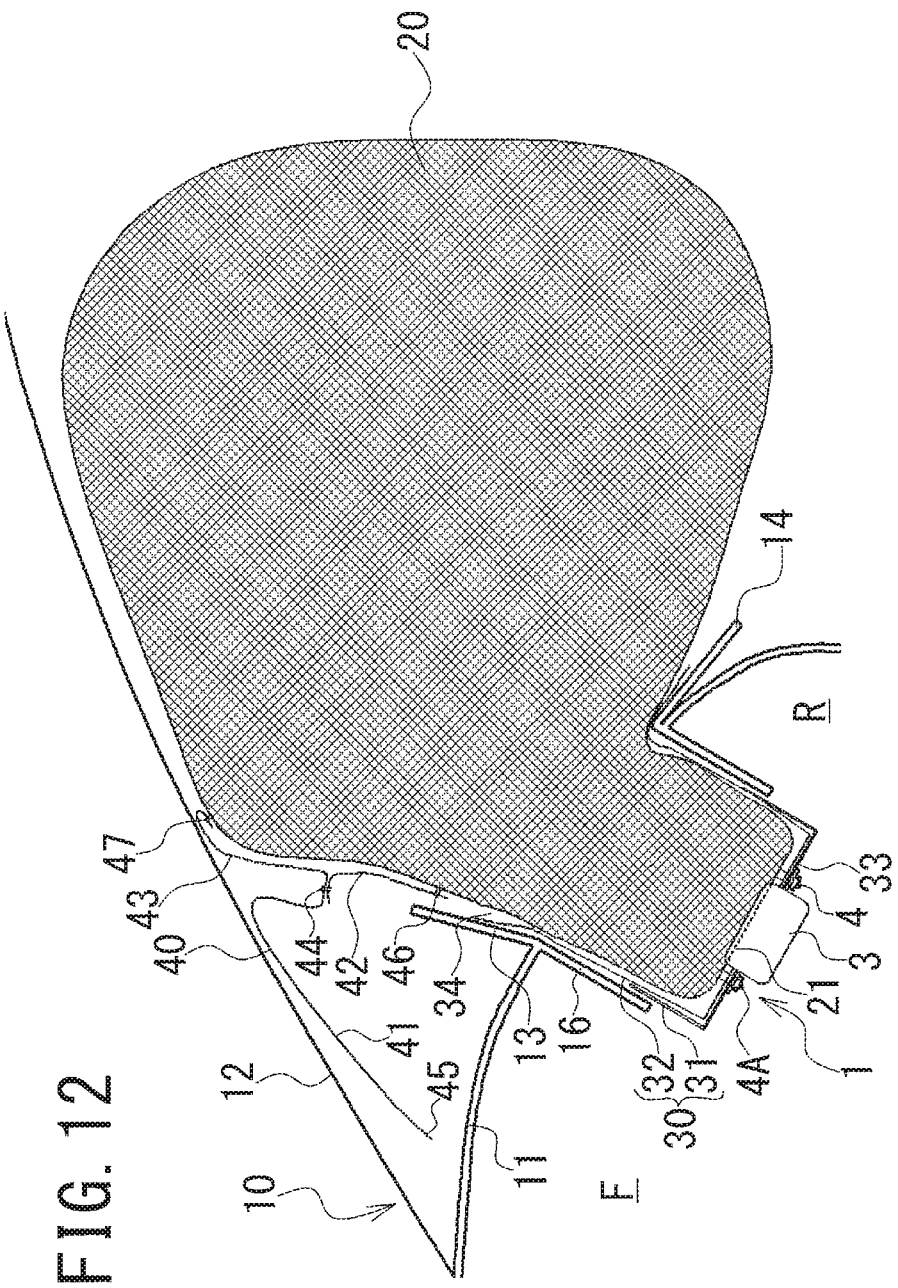
FIG. 12 is a cross-sectional view showing the manner of inflation and deployment of the airbag according to the first embodiment.
Figure 13:
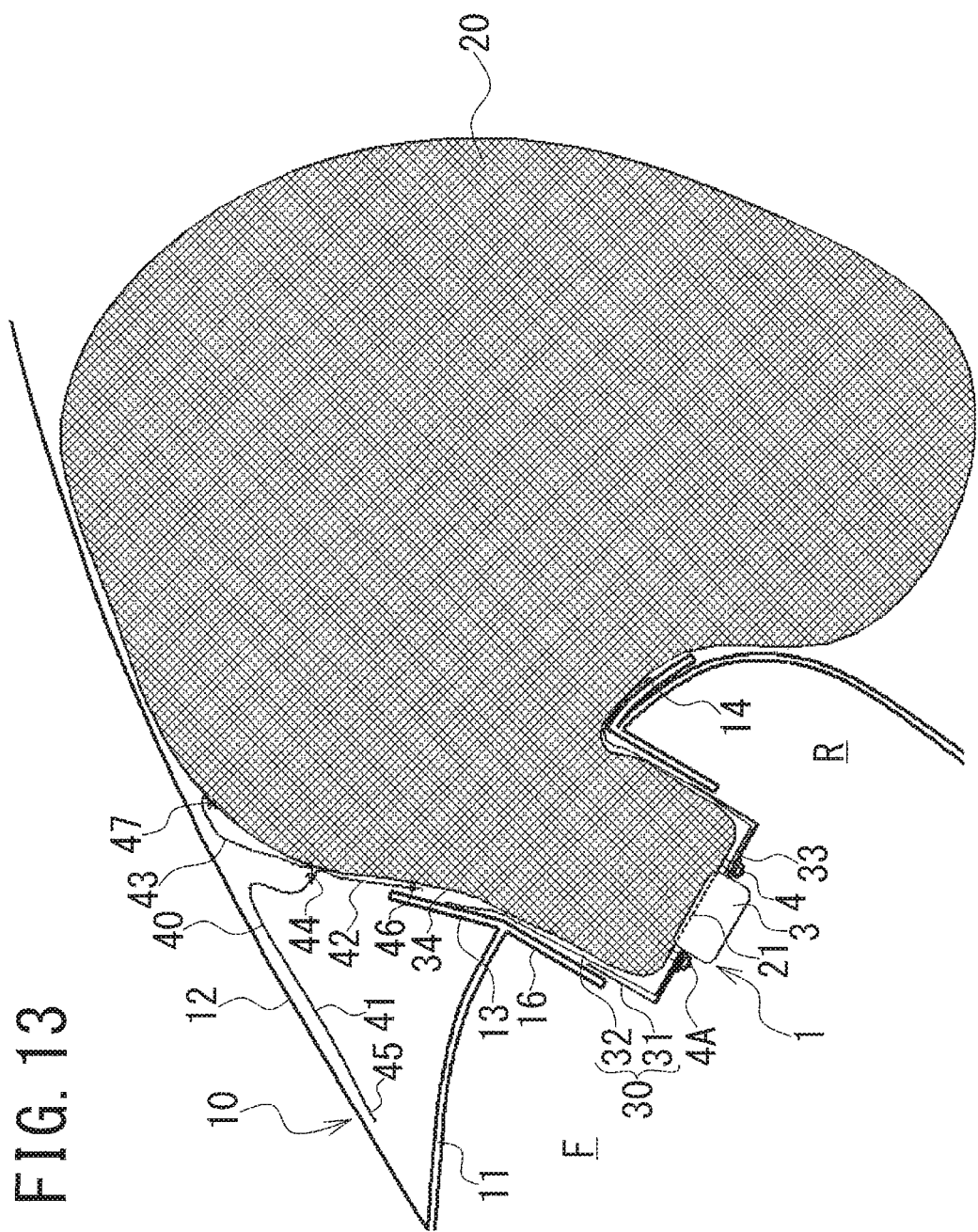
FIG. 13 is a cross-sectional view showing the manner of inflation and deployment of the airbag according to the first embodiment.

As shown in FIGS. 7 to 13, the airbag 20 inflates by the gas and opens the opening 34 of the holding member 30 and the lid 14 of the airbag cover 13 (see FIG. 7). At this time, the opposite sides 24 (not shown in FIGS. 7 to 13) of the airbag 20 push and open the lid 14, and deploy toward the vehicle width each direction in the cabin. Subsequently, the flip folded portion 50 and the roll folded portion 60 inflate and deploy in order.

The flip folded portion 50 unfolds easier than the roll folded portion 60. Accordingly, the gas is prone to flow the flip folded portion 50 than the roll folded portion 60, and the inflation and deployment are facilitated at the flip folded portion 50 than the roll folded portion 60. Accordingly, in the initial inflation and deployment of the airbag 20, the flip folded portion 50 inflates earlier than the roll folded portion 60, and inflates and deploys from the opening 34 of the holding member 30. As the flip folded portion 50 inflates, the flip folded portion 50 presses the roll folded portion 60 against a vehicle rear side portion of the holding member 30. As a result, the first restricting portion 41 of the flap 40 is interposed between the roll folded portion 60 and the holding member 30, and a clamped portion 48 of the first restricting portion 41 is clamped between the roll folded portion 60 and the holding member 30.

The clamped portion 48 of the first restricting portion 41 is between the first end 45 and junction 44 of the flap 40, and the first restricting portion 41 is joined to the second restricting portion 42 at the junction 44. Further, the second end 46 of the flap 40 is secured to the flip folded portion 50. Accordingly, due to inflation of the flip folded portion 50 of the airbag 20, tension generates at the first restricting portion 41 and the second restricting portion 42, between the clamped portion 48 and the second end 46. This causes the first restricting portion 41 to hold down the roll folded portion 60, that is, the flap 40 restricts deployment of the roll folded portion 60. As inflation of the flip folded portion 50 progresses, the first restricting portion 41 and the second restricting portion 42 move to rotate about the clamped portion 48 of the first restricting portion 41 (see FIGS. 8 to 10). The first restricting portion 41 and the second restricting portion 42 positioned on the vehicle rear side R relative to the airbag 20 restrict the inflation and deployment of the airbag 20 toward the vehicle rear side R. Therefore, the airbag 20 is facilitated to inflate and deploy toward the vehicle front side F than toward the vehicle rear side R.

When the inflator 3 generates the gas, firstly the covering portion 51 of the flip folded portion 50 inflates and deploys through the opening 34 of the holding member 30. Since the second end 46 of the flap 40 is secured to the covering portion 51, tension at the second restricting portion 42 between the second end 46 and the junction 44 gradually increases in accordance with the inflation and deployment of the covering portion 51. Thus, the second restricting portion 42 restricts the covering portion 51 inflates and deploys toward the vehicle rear side R. On the other hand, the vehicle front side portion of the flip folded portion 50 which is not covered with the flap 40 (the portion on the vehicle front side F) is facilitated to inflate and deploy, since the inflation and deployment of the flip folded portion 50 is not restricted by the flap 40. Accordingly, the flip folded portion 50 inflates and deploys preferentially at the vehicle front side F of the airbag 20, while the inflation and deployment of the flip folded portion 50 toward the vehicle rear side R is prevented.

The third restricting portion 43 of the flap 40 is folded into the flip folded portion 50, and the flip folded portion 50 inflates at least on one side of the third restricting portion 43.

Accordingly, the third restricting portion 43 is clamped by the flip folded portion. Further, when the flip folded portion 50 inflates, the second restricting portion 42 and third restricting portion 43, which are between the second end 46 and the third end 47, deploy together with the flip folded portion 50. Thus, tension generates at the second restricting portion 42 and the third restricting portion 43. In accordance therewith, the first restricting portion 41 and the second restricting portion 42 are pulled by the third restricting portion 43 toward the vehicle front side F hence, the flap 40 prevents the inflation and deployment of the airbag 20 toward the vehicle rear side R. Further, the airbag 20 is prevented to project toward the vehicle rear side R (toward the occupant), and the flip folded portion 50 of the airbag 20 gradually inflates without projecting toward the occupant.

When the airbag 20 starts to inflate and deploy, the flip folded portion 50 inflates from the superimposing portion 52 superimposed on the fixing portion 33, and the third restricting portion 43 of the flap 40 being between the fixing portion 33 and the roll folded portion 60 is as soon clamped by the inflated flip folded portion 50. Subsequently, the third restricting portion 43 is clamped by the flip folded portion 50 at the superimposing portion 52 and front-side portion 53 of the flip folded portion 50. Thus, the third restricting portion 43 is more surely clamped by the flip folded portion 50, and the force of which the third restricting portion 43 pulling toward the vehicle front side F the first restricting portion 41 and the second restricting portion 42 also increases. Accordingly, the flap 40 further prevents the inflation and deployment of the airbag 20 toward the vehicle rear side R and toward the opening 34.

By the flip folded portion 50 of the airbag 20 further inflates, the first restricting portion 41 of the flap 40 is gradually pulled out from between the roll folded portion 60 and the holding member 30. Further, the third restricting portion 43 of the flap 40 is gradually pulled out from into the flip folded portion 50, so that the third end 47 is pulled. In accordance therewith, a portion of the flip folded portion 50 secured to the third end 47 is gradually pulled out from in the flip folded portion 50, and the flip folded portion 50 further deploys (see FIG. 10). As a result, the rapid inflation and deployment of the flip folded portion 50 is prevented, and the projection of the flip folded portion 50 toward the vehicle rear side R is also prevented.

By the flip folded portion 50 of the airbag 20 further inflates, the first restricting portion 41 of the flap 40 is drawn from between the roll folded portion 60 and the holding member 30, so that the tension at the first restricting portion 41 is dissolved. Further, when the entire third restricting portion 43 is pulled out from in the flip folded portion 50, the flip folded portion 50 releases the third restricting portion 43 from the clamped state, and the tension at the second restricting portion 42 and third restricting portion 43 is also dissolved (see FIG. 11). This enables the entire airbag 20 to inflate and deploy, and the roll folded portion 60 of the airbag 20 inflates and deploys (see FIG. 12). Thereafter, the entire airbag 20 inflates and deploys on the vehicle front side F facing the occupant (see FIG. 13), and the airbag 20 is disposed between the instrument panel 11 and the occupant. The occupant is protected by being held by the airbag 20.

The second end 46 and third end 47 of the flap 40 are respectively secured to the surface of the airbag 20. The length of the flap 40 between the second end 46 and the third end 47 is the sum of the length of the second restricting portion 42 and the length of the third restricting portion 43, and is equal to or greater than the length of the airbag 20 between the second end 46 and the third end 47. When the airbag 20 has fully inflated and deployed, the second restricting portion 42 and third restricting portion 43 of the flap 40 are positioned in the vehicle front side F of the airbag 20, and are disposed along a part of the airbag 20 as being loosened. The first restricting portion 41 of the flap 40 is positioned at the vehicle front side F of the airbag 20, which is joined to the second restricting portion 42 and the third restricting portion 43.

The airbag 20 inflates and deploys in the foregoing manner, and protects an occupant in a normal sitting posture. Here, at least the occupant's head is protected by the airbag 20. Further, when the occupant is in an abnormal posture (the OOP posture) also, the occupant is protected by the airbag 20. In the following, a description will be given of protection of the occupant in the OOP posture, exemplarily focusing on the case where the occupant's head is in contact with the instrument panel 11.

FIGS. 14A to 16B are each a diagram for describing the protection of the occupant 5 in the OOP posture with the airbag 20 according to the first embodiment. FIGS. 14A, 15A, and 16A are each a cross-sectional view schematically showing the airbag device 1 and the airbag 20. FIGS. 14B, 15B, and 16B are each a diagram showing the instrument panel 11, the airbag 20, and the occupant 5 as seen from the vehicle rear side R.

As shown in FIGS. 14A to 16B, when the head 5A of the occupant 5 (for example, a child) is in contact with the instrument panel 11, the airbag 20 inflates and deploys close to the head 5A of the occupant 5. Accordingly, in the initial inflation and deployment of the airbag 20, the airbag 20 is brought into contact with the occupant 5 (here, the head 5A).

In the initial inflation and deployment of the airbag 20, in the state in which the inflation and deployment of the airbag 20 are restricted by the flap 40, the flip folded portion 50 of the airbag 20 inflates. The occupant 5 is pushed by the inflating force of the flip folded portion 50 and moves toward the vehicle rear side R. At this time, the flap 40 restricts the inflation and deployment of the flip folded portion 50 toward the vehicle rear side R (toward the occupant 5). Further, before the roll folded portion 60 deploys toward the vehicle rear side R, the occupant 5 is pushed by the inflated flip folded portion 50 to be away from the instrument panel 11 and the airbag 20. This prevents any damage that may be done by the airbag 20 to the occupant 5 in the OOP posture, and hence the risk of injury to the occupant 5 by the airbag 20 reduces.

When the occupant 5 is pushed by the inflated flip folded portion 50, the gas is discharged from the vent hole 22 of the airbag 20, so that shock given by the inflating force of the flip folded portion 50 to the occupant 5 reduces. Subsequently, the airbag 20 inflates and deploys between the occupant 5 and the instrument panel 11, and the entire airbag 20 inflates and deploys on the vehicle front side F facing the occupant 5. Thereafter, similarly to the normal inflation and deployment of the airbag 20, the occupant 5 is protected by being held by the airbag 20.

The airbag device 1 described above can reduce the risk of injury to the occupant associated with the airbag 20 in the initial inflation and deployment, irrespective of the shape of the airbag 20. When the airbag 20 is in a simple shape also, the use of the flap 40 reduces the risk of injury to the occupant. Therefore, it is not necessary for the airbag 20 to have a complicated shape. Further, by the folding manner of the airbag 20 and the flap 40, the deployment direction of the airbag 20 in the initial inflation and deployment of the airbag 20 can be controlled.

The third restricting portion 43 of the flap 40 is disposed into the flip folded portion 50, between the superimposing portion 52 of the flip folded portion 50 and the roll folded portion 60. Accordingly, as described above, the force of the third restricting portion 43 pulling toward the vehicle front side F the first restricting portion 41 and the second restricting portion 42 can be increased, so that the inflation and deployment of the airbag 20 toward the vehicle rear side R and the opening 34 are further prevented.

The length of the flap 40 between the second end 46 and the third end 47 is equal to or greater than the length of the airbag 20 between the second end 46 and the third end 47. This allows the airbag 20 to fully inflate and deploy without being hindered by the flap 40 (the second restricting portion 42, the third restricting portion 43) between the second end 46 and the third end 47. When the length of the flap 40 between the second end 46 and the third end 47 is equal to the length of the airbag 20 between the second end 46 and the third end 47, tension can be generated efficiently at the flap 40 in accordance with the inflation and deployment of the flip folded portion 50.

The opening 34 of the holding member 30 may be previously formed an aperture or may be formed an aperture by the inflating and deploying airbag 20. When the airbag 20 forms the opening 34, for example, the inflating and deploying airbag 20 opens a part of the holding member 30, thereby forming the opening 34 at the position opposite to the fixing portion 33 of the holding member 30.

The third restricting portion 43 of the flap 40 may be folded into the flip folded portion 50 and the roll folded portion 60. In this case, the third restricting portion 43 is positioned between the flip folded portion 50 and the roll folded portion 60, between the superimposing portion 52 of the flip folded portion 50 and the roll folded portion 60. The inflated flip folded portion 50 presses the third restricting portion 43 against the roll folded portion 60 and is clamped by the flip folded portion 50 and the roll folded portion 60. Further, concerning the flap 40, three pieces of fabric may be joined at the junction 44 to be Y-shaped. Alternatively, two pieces of fabric may be joined in a manner different from the above-described manner, or the flap 40 may be formed by a single piece of fabric.

FIGS. 17A to 19B show the flap 40 of other examples, and respectively show the flap 40 similarly to FIGS. 2A and 2B.

Figure 17A:
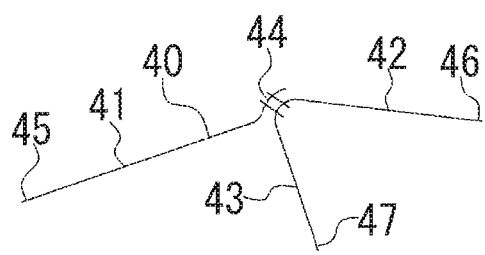
FIGS. 17A and 17B are each a diagram showing a flap of another example.
Figure 17B:
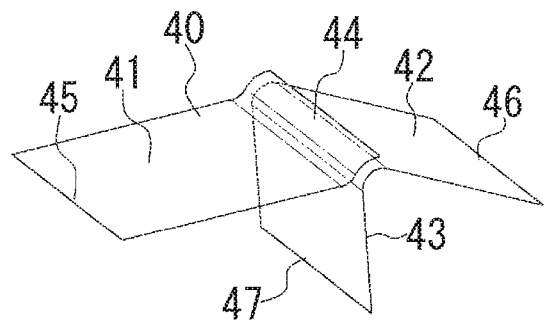

In connection with the flap 40 shown in FIGS. 17A and 17B, the second restricting portion 42 and the third restricting portion 43 are a single piece of quadrangular fabric, and the junction 44 is positioned between the second restricting portion 42 and the third restricting portion 43. The first restricting portion 41 is a single piece of quadrangular fabric and is joined to the second restricting portion 42 and the third restricting portion 43 at the junction 44.

Figure 18A:
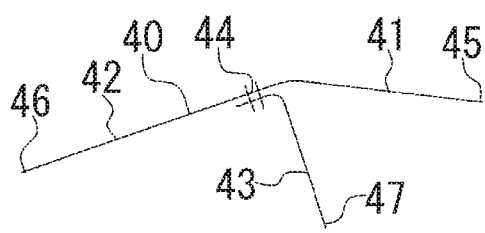
FIGS. 18A and 18B are each a diagram showing a flap of still another example.
Figure 18B:
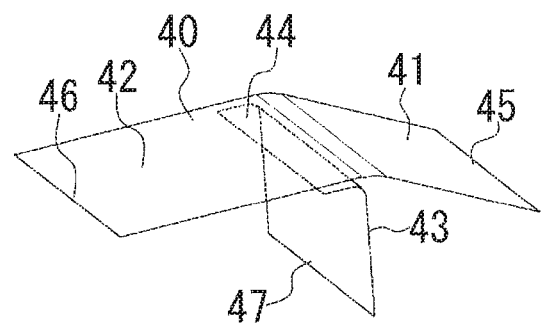

In connection with the flap 40 shown in FIGS. 18A and 18B, the first restricting portion 41 and the second restricting portion 42 are a single piece of quadrangular fabric, and the junction 44 is positioned between the first restricting portion 41 and the second restricting portion 42. The third restricting portion 43 is a single piece of quadrangular fabric and is joined to the first restricting portion 41 and the second restricting portion 42 at the junction 44.

Figure 19A:
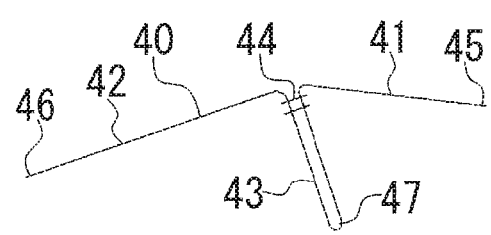
FIGS. 19A and 19B are each a diagram showing a flap of yet another example.
Figure 19B:
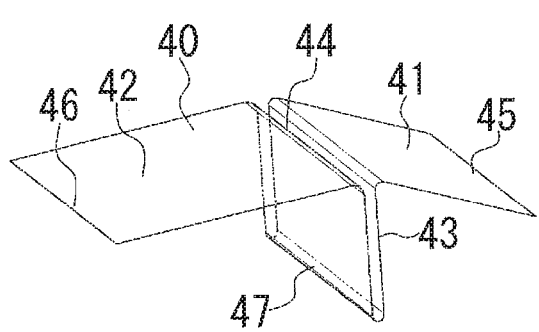

In connection with the flap 40 shown in FIGS. 19A and 19B, the flap 40 is a single piece of quadrangular fabric. The fabric of the flap 40 is folded at the tip (the third end 47) of the third restricting portion 43 and at the junction 44 and is joined at the junction 44. The first restricting portion 41, second restricting portion 42, and the third restricting portion 43 joined together in a Y shape are thus formed.

Second Embodiment

Next, a description will be given of an airbag device according to a second embodiment. The airbag device is structured basically similarly to the airbag device 1 according to the first embodiment. Accordingly, in the following, the description will be given of the difference from the already described matters, and the description of those having already described will be omitted. Further, in connection with the airbag according to the second embodiment, the structures corresponding to those of the airbag device 1 are referred to by the designations and reference signs identical to those of the airbag device 1.

Figure 20:
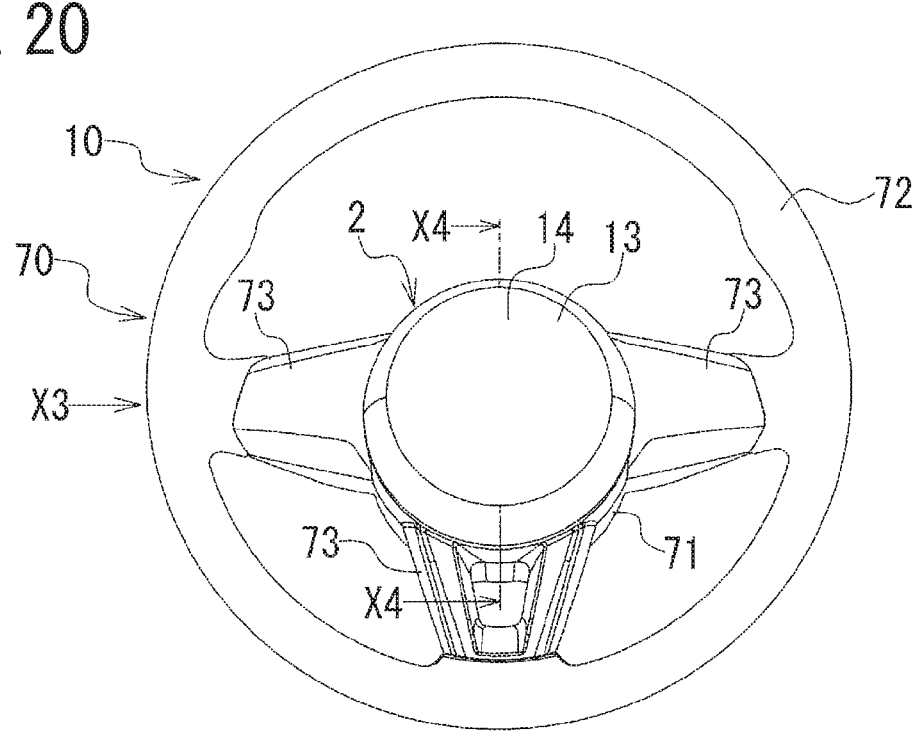
FIG. 20 is a perspective view showing a steering wheel including an airbag device according to a second embodiment.
Figure 21:
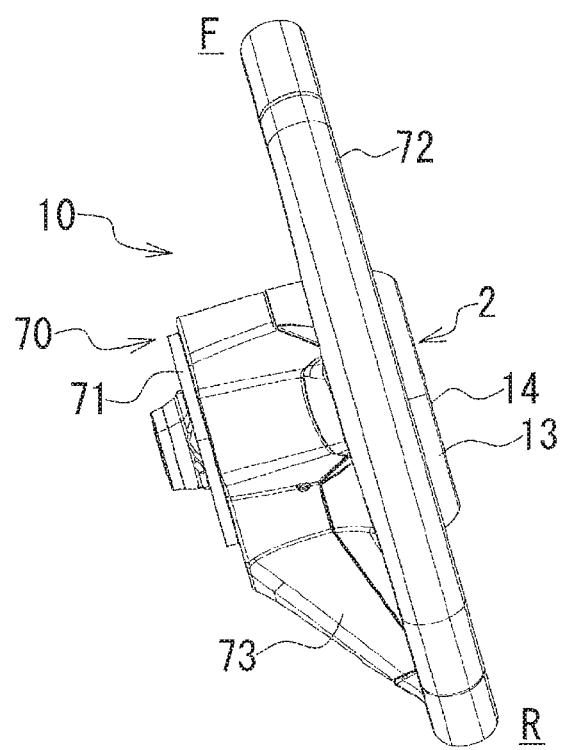
FIG. 21 is a side view showing the steering wheel as seen in a direction of an arrow X3 in FIG. 20.

FIG. 20 is a perspective view showing a steering wheel 70 including the airbag device 2 according to the second embodiment, as seen from an occupant. FIG. 21 is a side view of the steering wheel 70 as seen in a direction of an arrow X3 in FIG. 20.

As shown in FIGS. 20 and 21, the airbag device 2 is for a driver's seat and is disposed on the vehicle front side facing the driver's seat. The airbag device 2 protects the occupant on the driver's seat with an inflatable and deployable airbag 20. The vehicle 10 includes the steering wheel 70 positioned in the vehicle front side facing the driver's seat, and the airbag device 2 is mounted on the steering wheel 70 of the vehicle 10.

The steering wheel 70 is disposed on the vehicle front side facing the occupant as being inclined relative to the vehicle vertical direction. In this state, the upper portion of the steering wheel 70 is positioned on the vehicle front side F, and the lower portion of the steering wheel 70 is positioned on the vehicle rear side R. Accordingly, in connection with the airbag device 2 for the driver's seat, in the steering wheel 70 in a straight-traveling mode of the vehicle 10, the upper side of the steering wheel 70 corresponds to the vehicle front side F, and the lower side of the steering wheel 70 corresponds to the vehicle rear side R.

The steering wheel 70 has a boss 71 attached to the steering shaft of the vehicle 10, an annular rim 72 positioned on the outer side of the boss 71, and a plurality of spokes 73 that couple the boss 71 and the rim 72 to each other. The airbag device 2 is attached to the boss 71 and is disposed on the inner side of the rim 72. When the inflator 3 generates the gas, the airbag 20 inflates and deploys so as to cover the steering wheel 70 and is disposed between the steering wheel 70 and the occupant. The airbag device 2 protects, with the airbag 20, the occupant in the normal sitting posture and the occupant in the OOP posture similarly to the airbag device 1 according to the first embodiment.

Figure 22:
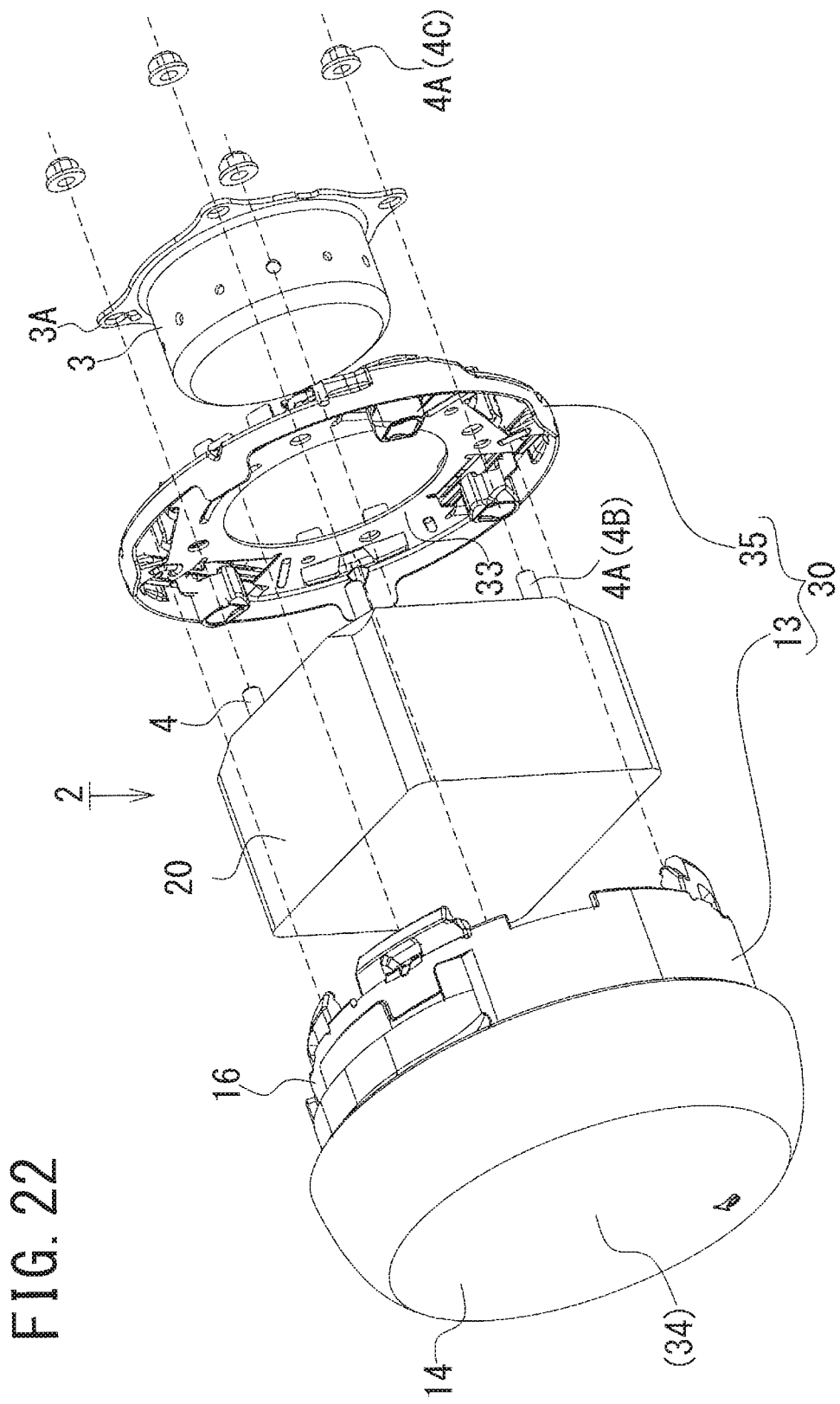
FIG. 22 is a perspective view showing the structure of the airbag device according to the second embodiment.

FIG. 22 is a perspective view showing the structure of the airbag device 2 according to the second embodiment, which shows the airbag device 2 in an exploded state.

As shown in FIG. 22, the airbag device 2 includes the synthetic resin airbag cover 13, the folded airbag 20, the fixing member 4, the holding member 30, and the inflator 3. Here, the holding member 30 is made up of an annular holding plate 35, and the cup-shaped airbag cover 13. The holding plate 35 is, for example, a reaction plate made of metal.

The attaching members 4A of the fixing member 4 attach the airbag 20 and the inflator 3 to the holding plate 35, thereby the airbag 20 and the inflator 3 are fixed to the fixing portion 33 of the holding plate 35. The holding plate 35 is attached to the airbag cover 13, to be assembled into the holding member 30. The airbag 20 is housed in the holding plate 35 and the airbag cover 13 as being folded, and is held by the holding member 30. When the airbag 20 inflates and deploys, the airbag 20 opens the lid 14 of the airbag cover 13, thereby forming the opening 34 at the holding member 30.

Figure 23:
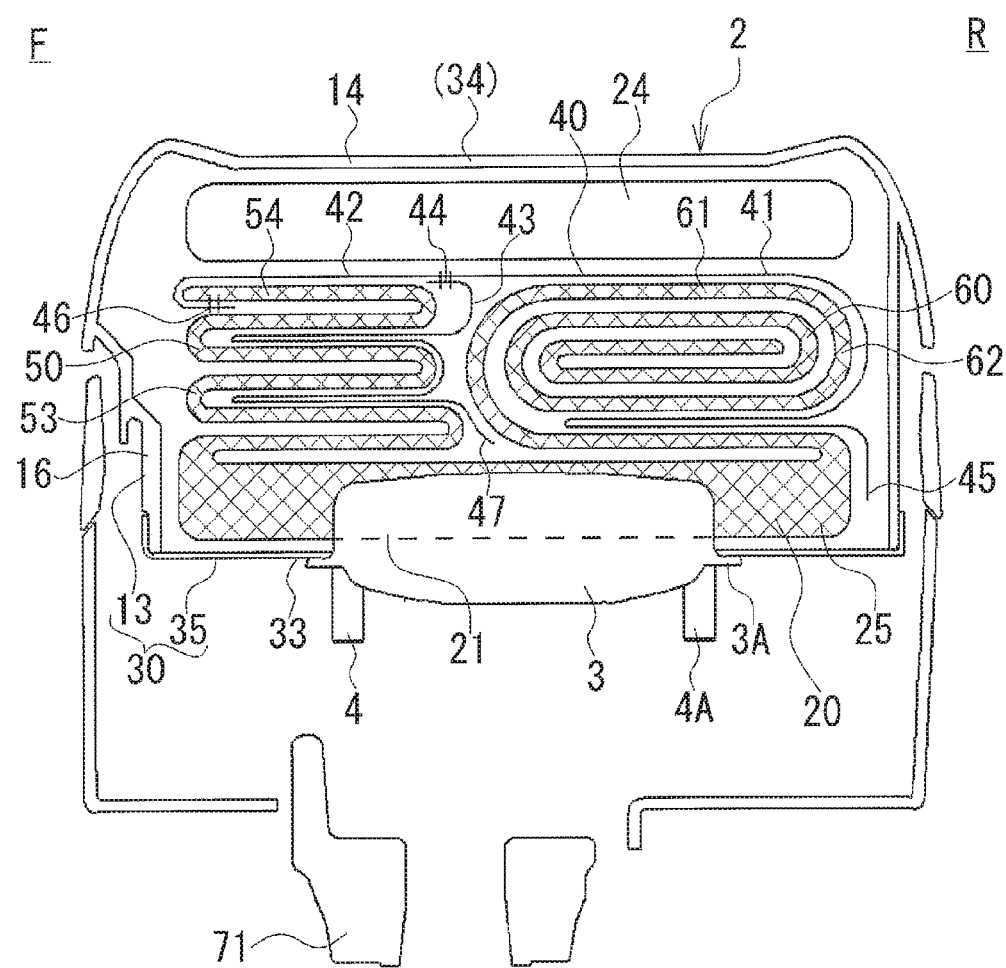
FIG. 23 is a cross-sectional view showing the airbag device and a boss taken along line X4-X4 in FIG. 20.

FIG. 23 is a cross-sectional view of the airbag device 2 and the boss 71 taken along line X4-X4 in FIG. 20, which schematically shows the airbag device 2 and the airbag 20 similarly to FIG. 1.

As shown in FIG. 23, the airbag 20 has the roll folded portion 60 disposed in the vehicle rear side R thereof and the flip folded portion 50 disposed in the vehicle front side F thereof. The folded airbag 20 is disposed in the vehicle 10 as being surrounded by the holding member 30. In the present embodiment, the flip folded portion 50 is an accordion folded portion having an accordion-fold shape and is formed in the airbag 20 by being folded up into accordion. The flip folded portion 50 folded up into accordion is disposed in the vehicle front side F of the roll folded portion 60.

The second restricting portion 42 of the flap 40 covers an opening side portion (an opening-side portion 54) of the flip folded portion 50, and the second end 46 of the flap 40 is fixed to the flip folded portion 50 into the flip folded portion 50. The third restricting portion 43 of the flap 40 is folded into the flip folded portion 50 of the accordion-fold shape and is folded back together the flip folded portion 50 to be disposed in an accordion shape. Further, the third restricting portion 43 is also disposed between the flip folded portion 50 and the roll folded portion 60. The third end 47 of the flap 40 is not secure to the airbag 20 and is disposed between the flip folded portion 50 and the roll folded portion 60.

Figure 24:
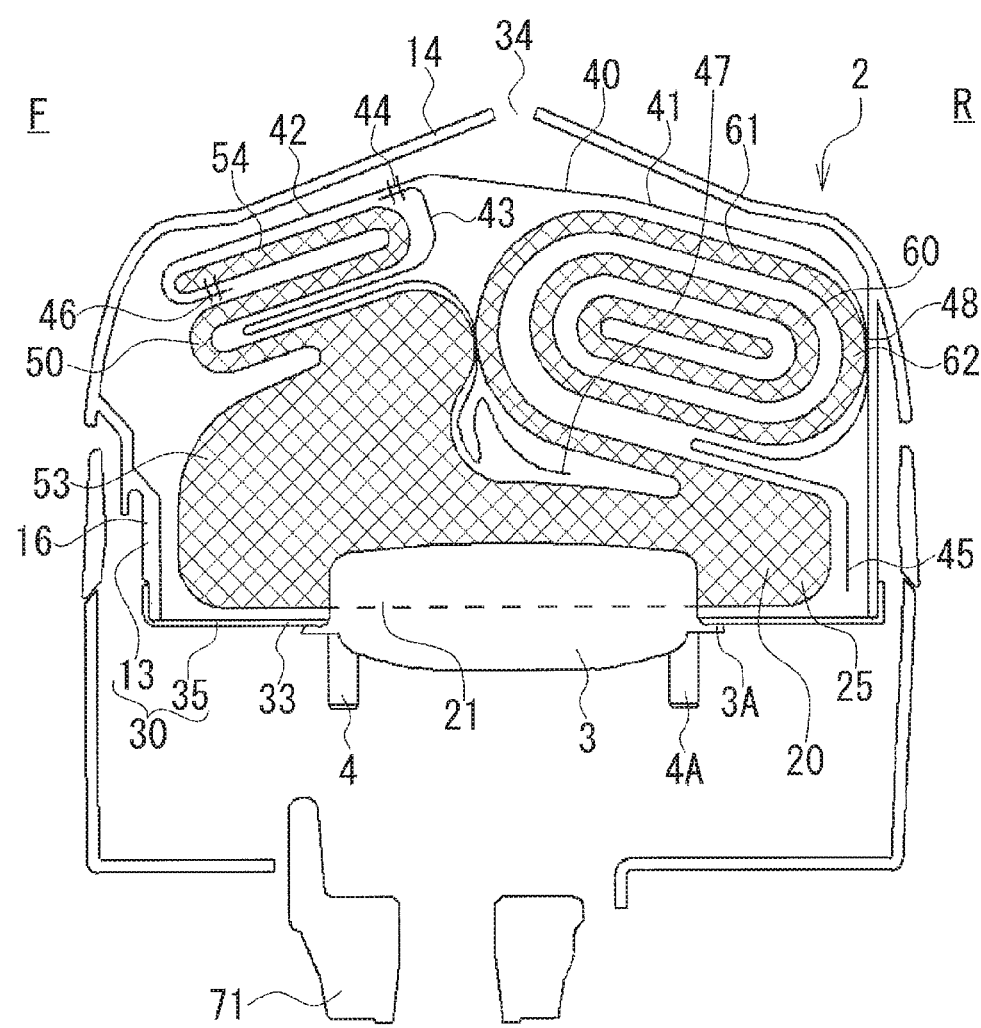
FIG. 24 is a cross-sectional view showing a manner of inflation and deployment of an airbag according to the second embodiment.
Figure 25:
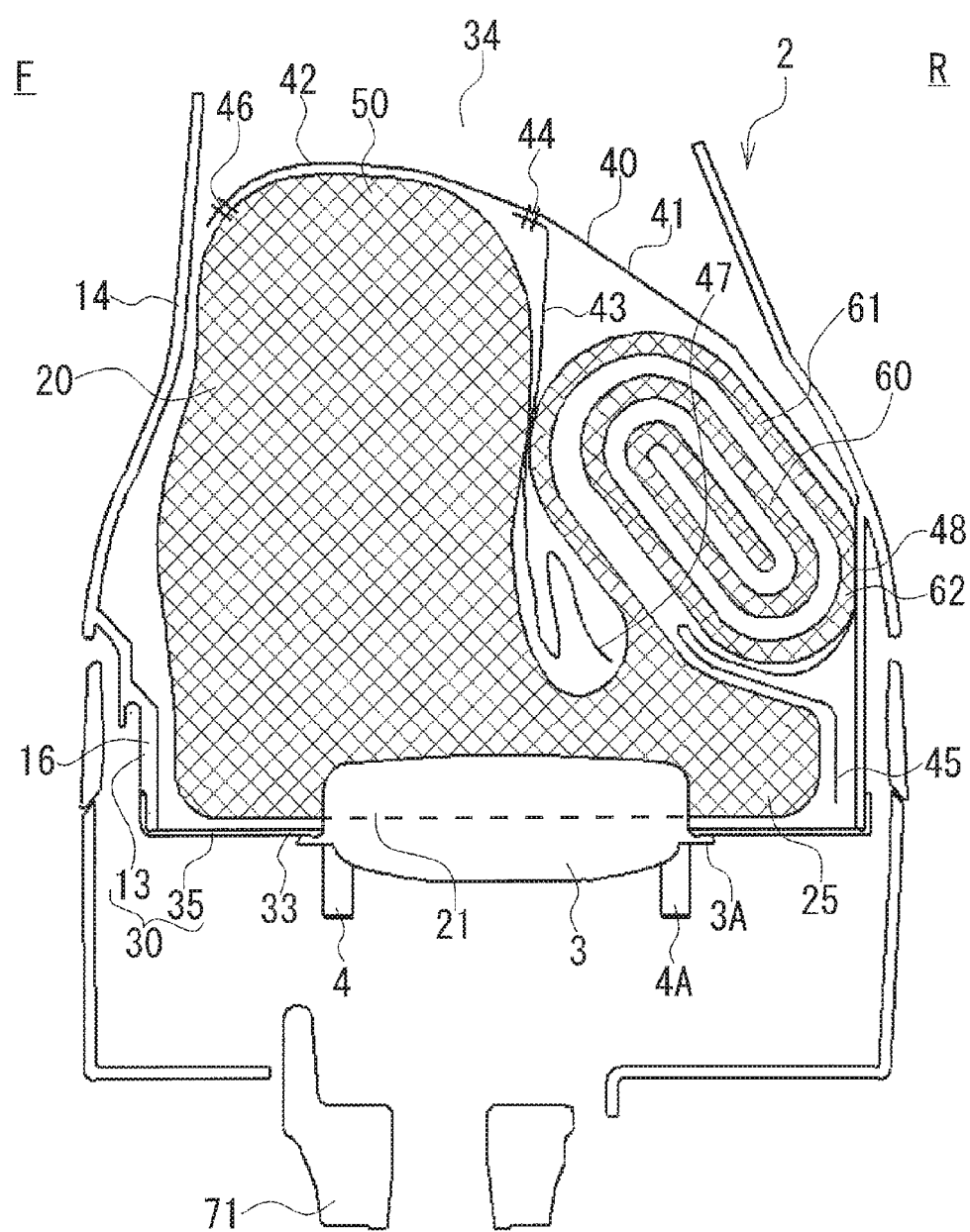
FIG. 25 is a cross-sectional view showing the manner of inflation and deployment of the airbag according to the second embodiment.

FIGS. 24 and 25 are each a cross-sectional view showing a manner of inflation and deployment of the airbag 20 according to the second embodiment, which schematically show the airbag device 2 and the airbag 20 similarly to FIG. 23.

As shown in FIGS. 24 and 25, the airbag 20 inflates with the gas and forms the opening 34 at the holding member 30. Subsequently, the airbag 20 inflates and deploys through the opening 34. Here, similarly to the airbag device 1 according to the first embodiment, the flap 40 restricts the inflation and deployment of the airbag 20, and the flip folded portion 50 and roll folded portion 60 of the airbag 20 inflate and deploy.

The airbag device 2 according to the second embodiment also exhibits the effect similar to that exhibited by the airbag device 1 according to the first embodiment. Further, the third restricting portion 43 of the flap 40 is clamped by the flip folded portion 50 into the flip folded portion 50 and is clamped by the flip folded portion 50 and the roll folded portion 60. Thus, the third restricting portion 43 is surely clamped, and the force of the third restricting portion 43 pulling the first restricting portion 41 and the second restricting portion 42 also increases. Accordingly, the flap 40 further prevents the inflation and deployment of the airbag 20 toward the vehicle rear side R and the opening 34. The third end 47 of the flap 40 may be disposed into the flip folded portion 50 and may be secured to the flip folded portion 50.

What is claimed is:

1. An airbag device to be disposed in a front side of a vehicle facing an occupant,
the airbag device comprising:
an inflator that generates gas;
an airbag that inflates with the gas generated by the inflator;
a holding member that surrounds the airbag, and has a fixing portion to which the airbag and the inflator are fixed and an opening opposite to the fixing portion, and permits inflation and deployment of the airbag only through the opening; and
a flap that has a first restricting portion, a second restricting portion and a third restricting portion joined together in a Y shape at a junction, and restricts the inflation and deployment of the airbag through the opening of the holding member,
wherein
the airbag has a roll folded portion, which is folded into a roll, disposed to a rear side of the vehicle thereof, and a flip folded portion, which is folded up into accordion or is tucked, disposed to the front side of the vehicle thereof,
the first restricting portion covers a portion of the roll folded portion of the opening side, and is disposed between a vehicle rear side portion of the roll folded portion and the holding member,
a tip of the second restricting portion is secured to the flip folded portion, and
the third restricting portion is folded into the flip folded portion or between the flip folded portion and the roll folded portion.

2. The airbag device according to claim 1, wherein
the flip folded portion is disposed in the front side of the vehicle relative to the roll folded portion, and is disposed between the roll folded portion and the fixing portion, and
the third restricting portion is disposed, between a portion of the flip folded portion superimposed on the fixing portion and the roll folded portion, into the flip folded portion or between the flip folded portion and the roll folded portion.

3. The airbag device according to claim 1, wherein
a tip of the third restricting portion is secured to a surface of the airbag, and
a length of the flap between the tip of the second restricting portion and the tip of the third restricting portion is equal to or greater than a length of the airbag between the tip of the second restricting portion and the tip of the third restricting portion.

* * * * *